(12) United States Patent
Ryu et al.

(10) Patent No.: US 11,458,807 B2
(45) Date of Patent: Oct. 4, 2022

(54) AIR CONDITIONER FOR VEHICLE

(71) Applicant: Hanon Sytems, Daejeon (KR)

(72) Inventors: Jae Chun Ryu, Daejeon (KR); Dae Bok Keon, Daejeon (KR); Yun Jin Kim, Daejeon (KR); Jong Bo Won, Daejeon (KR); Se Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 395 days.

(21) Appl. No.: 16/498,226

(22) PCT Filed: Apr. 2, 2018

(86) PCT No.: PCT/KR2018/003845
§ 371 (c)(1),
(2) Date: Sep. 26, 2019

(87) PCT Pub. No.: WO2018/190548
PCT Pub. Date: Oct. 18, 2018

(65) Prior Publication Data
US 2020/0031197 A1 Jan. 30, 2020

(30) Foreign Application Priority Data

Apr. 14, 2017 (KR) .................. 10-2017-0048487

(51) Int. Cl.
*B60H 1/24* (2006.01)
*B60H 1/00* (2006.01)
(Continued)

(52) U.S. Cl.
CPC ..... *B60H 1/00849* (2013.01); *B60H 1/00007* (2013.01); *B60H 1/00821* (2013.01);
(Continued)

(58) Field of Classification Search
CPC ...... B60H 1/00007; B60H 2001/00214; B60H 1/00849; B60H 1/00821; B60H 1/241; B60H 1/248; B60H 1/26; B60H 1/008
(Continued)

(56) References Cited

U.S. PATENT DOCUMENTS 3,199,435 A * 8/1965 Jenson ............... F24C 15/20
126/299 D
2004/0185764 A1* 9/2004 Ichishi ............... B60H 1/004
454/75

(Continued)

FOREIGN PATENT DOCUMENTS

KR 19980044563 A 9/1998
KR 200309789 Y1 4/2003
(Continued)

OTHER PUBLICATIONS

Written Opinion of the International Searching Authority for International Application No. PCT/KR2018/003845; dated Jul. 25, 2018; 10 pages.
(Continued)

*Primary Examiner* — Ko-Wei Lin
(74) *Attorney, Agent, or Firm* — Dickinson Wright PLLC

(57) ABSTRACT

The present invention relates to an air conditioner for a vehicle, which includes a cold air passageway and a warm air passageway, and two blowers disposed in the air passageways, thereby rapidly ventilating the interior of the vehicle using the two blowers.

15 Claims, 20 Drawing Sheets

(51) Int. Cl.
*B60H 1/26* (2006.01)
*B60H 3/06* (2006.01)
(52) U.S. Cl.
CPC ......... *B60H 1/00828* (2013.01); *B60H 1/241* (2013.01); *B60H 1/248* (2013.01); *B60H 1/26* (2013.01); *B60H 3/06* (2013.01)
(58) Field of Classification Search
USPC .......................... 454/141–143, 156, 158–16
See application file for complete search history.

(56) References Cited

U.S. PATENT DOCUMENTS

| | | | | |
|---|---|---|---|---|
| 2006/0070388 | A1* | 4/2006 | Yamaguchi | B60H 3/0608 62/186 |
| 2007/0238406 | A1* | 10/2007 | Jeong | B60H 1/00849 454/139 |
| 2011/0005255 | A1* | 1/2011 | Tanihata | B60H 1/00921 62/238.7 |
| 2012/0241126 | A1* | 9/2012 | Kishi | B60H 1/008 165/42 |
| 2012/0315836 | A1* | 12/2012 | Scoccia | B60H 1/00207 454/143 |
| 2013/0186050 | A1* | 7/2013 | Skopis | F24F 13/085 55/385.2 |
| 2014/0065943 | A1* | 3/2014 | Clemence | B60H 1/24 454/265 |
| 2014/0075974 | A1* | 3/2014 | Klein | B60H 1/00057 62/119 |
| 2014/0075975 | A1* | 3/2014 | Graaf | B60H 1/0005 62/119 |
| 2014/0194048 | A1* | 7/2014 | Wittmann | B60H 1/24 454/139 |
| 2014/0216705 | A1* | 8/2014 | Dage | B60H 1/00828 165/202 |
| 2015/0082820 | A1* | 3/2015 | Takahashi | B60H 1/00035 62/238.7 |
| 2016/0207371 | A1* | 7/2016 | Della Rovere | B60H 1/00028 |
| 2016/0355069 | A1* | 12/2016 | Vincent | F04D 25/06 |
| 2017/0080778 | A1* | 3/2017 | Suzuki | B60H 1/0075 |
| 2017/0174045 | A1* | 6/2017 | Shimauchi | B60H 1/00864 |
| 2018/0029447 | A1* | 2/2018 | Kato | B60H 1/00671 |
| 2019/0054793 | A1* | 2/2019 | Fujii | B60H 1/00285 |
| 2019/0054795 | A1* | 2/2019 | Terayama | H05K 7/20945 |
| 2019/0061469 | A1* | 2/2019 | Hirata | B60H 1/12 |
| 2020/0298659 | A1* | 9/2020 | Sakane | B60H 1/00 |

FOREIGN PATENT DOCUMENTS

| | | |
|---|---|---|
| KR | 20030075846 A | 9/2003 |
| KR | 100745077 B1 | 8/2007 |
| KR | 101491243 B1 | 2/2015 |
| KR | 20160027527 A | 3/2016 |
| KR | 20170018995 A | 2/2017 |

OTHER PUBLICATIONS

International Search Report (ISR) for International Application No. PCT/KR2018/003845; dated Jul. 25, 2018; 5 pages; English Translation of the ISR is Included.

\* cited by examiner

PRIOR ART

PRIOR ART

PRIOR ART

AIR CONDITIONER FOR VEHICLE

CROSS-REFERENCE TO RELATED APPLICATIONS

This application is a U.S. National Stage of International Patent Application Serial No. PCT/KR2018/003845, filed Apr. 2, 2018, and titled "Air Conditioner for Vehicle," which claims the benefit of Korean Patent Application Serial No. 10-2017-0048487, filed Apr. 14, 2017, and titled "Air Conditioning System for Automotive Vehicles", the entire disclosures of each of the above applications are hereby incorporated by reference.

TECHNICAL FIELD

The present invention relates to an air conditioner for a vehicle and, more particularly, to an air conditioner for a vehicle which includes a cold air passageway and a warm air passageway, thereby rapidly ventilating the interior of the vehicle using blowers of the air conditioner while performing heating or cooling and enabling blowing fans disposed in the passageways to uniformly inhale and move air.

BACKGROUND ART

In general, as shown in FIG. 1, an air conditioner for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and for evaporating the refrigerant to cool the air discharged to the interior of the vehicle through heat absorption by evaporative latent heat, and that the compressor 1, the condenser 2, the expansion valve 3 and the evaporator 4 are connected with one another via refrigeration pipes. The air conditioning system cools the interior of the vehicle through the following refrigerant circulation process.

When a cooling switch (not shown) of the air conditioner for a vehicle is turned on, first, the compressor 1 inhales and compresses vapor-phase refrigerant of low-temperature and low-pressure while driving by driving power of an engine or a motor, and then sends the refrigerant in the gaseous phase of high-temperature and high-pressure to the condenser 2. Then, the condenser 2 condenses the vapor-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the vapor-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown), which is mounted inside the air-conditioning case, and, through which coolant of the engine circulates, or by an electric heater (not shown) mounted inside the air-conditioning case. In the meantime, the condenser 2 is mounted at the front side of the vehicle to radiate heat while exchanging heat with air.

Recently, an air conditioning system which carries out heating and cooling only using a refrigeration cycle has been developed. As shown in FIG. 2, such an air conditioning system includes: a cold air passageway 11 and a warm air passageway 12 which are partitioned to the right and the left inside one air-conditioning case 10; an evaporator 4 mounted on the cold air passageway 11 for cooling; and a condenser 2 mounted on the warm air passageway 12 for heating.

In this instance, at an outlet of the air-conditioning case 10, formed are a plurality of air outflow ports 15 for supplying air to the interior of the vehicle and a plurality of air discharge ports 16 for discharging air to the exterior of the vehicle. Furthermore, blowers 20 which are operated individually are respectively mounted at an inlet of the cold air passageway 11 and at an inlet of the warm air passageway 12. The air-conditioning case 10 and the blowers 20 in the air conditioning system are mounted inside the interior of the vehicle based on a dash panel (not shown), which partitions an engine room from the interior of the vehicle.

Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the condenser 2 of the warm air passageway 12 is discharged to the exterior of the vehicle through the air discharge port 16.

In a heating mode, warm air heated while passing through the condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

However, such an air conditioner is difficult to form a filter in front of the blowers 20 due to a difference in arrangement since the two blowers are arranged to be spaced apart from each other and the indoor air inlet and the outdoor air inlet are located unidirectionally, for instance, in a vertical direction, and is disadvantageous in an aspect of fluidity since straightness of the inhaled air is not guaranteed.

Moreover, as shown in FIG. 3, an extractor 50 which discharges indoor air of the vehicle to the outside of the vehicle is generally mounted at a trunk of the vehicle. The extractor 50 is opened by differential pressure between the indoor air and the outdoor air.

Therefore, when cold air or warm air is supplied to the interior of the vehicle through the air-conditioning case 10, a fixed quantity of the indoor air circulating in the vehicle is discharged to the outside of the vehicle through the extractor 50. For example, in the heating mode, warm air is introduced into the interior of the vehicle. In this instance, a fixed quantity of the indoor air is discharged to the outside of the vehicle through the extractor 50 due to VOC and moisture on a window.

However, because such an extractor 50 is opened just by differential pressure between the interior of the vehicle and the exterior of the vehicle, the air heated in the interior of the vehicle in summer cannot be rapidly discharged out. Moreover, even in the heating mode in winter, because the indoor air (heated air) discharged to the outside of the vehicle through the extractor 50 cannot be utilized, the conventional air conditioner needs additional components, such as a chiller, in order to enhance heating performance. Finally, because just the conventional extractor 50 cannot ventilate the interior of the vehicle when density of carbon dioxide causing driving while drowsy in the vehicle is rapidly increased. Therefore, studies and development of an air-conditioning case 10 to solve the above problems have been made actively.

DISCLOSURE

Technical Problem

Accordingly, the present invention has been made in view of the above-mentioned problems occurring in the prior art, and it is an object of the present invention to provide an air conditioner for a vehicle, which includes a cold air passageway and a warm air passageway, and two blowers disposed in the air passageways, thereby rapidly ventilating the interior of the vehicle using the two blowers.

It is another object of the present invention to provide an air conditioner for a vehicle, which includes a cold air passageway and a warm air passageway disposed in an air-conditioning case in such a way that an evaporator is mounted in the cold air passageway and a condenser is mounted in the warm air passageway, blowing fans communicating with the air passageways, and filter units disposed in front of the blowing fans so that air is uniformly inhaled to the blowing fans.

Technical Solution

To accomplish the above object, according to the present invention, there is provided an air conditioner for a vehicle including: an air-conditioning case having an outflow port for discharging air to the interior of the vehicle, a discharge port for discharging air to the outside of the vehicle, and a plurality of blowers; an indoor and outdoor air supply means connected with the plurality of blowers to selectively supply indoor air and outdoor air to the blowers; and a control unit for controlling the indoor and outdoor air supply means and the plurality of blowers in a ventilation mode in order to inhale the indoor air of the interior of the vehicle and discharge the indoor air to the outside of the vehicle through the discharge port or in order to inhale outdoor air and introduce the inhaled air to the interior of the vehicle through the outflow port.

Moreover, the control unit is mounted in the interior of the vehicle, and receives a value from a sensor for measuring temperature or carbon dioxide density and controls the indoor and outdoor air supply means and the plurality of blowers continuously or at regular intervals till the sensor value becomes lower than a set value if the sensor value is higher than the set value, so as to inhale the indoor air of the vehicle to discharge the inhaled air to the outside of the vehicle through the discharge port or inhale the outdoor air to introduce the inhaled air to the interior of the vehicle through the outflow port.

Furthermore, the plurality of blowers are a first blower mounted at an entrance of the air-conditioning case and a second blower mounted at one side of the first blower. The control unit controls the first blower to inhale the indoor air of the vehicle and discharge the inhaled air to the outside of the vehicle through the discharge port and controls the second blower to inhale the outdoor air and discharge the inhaled air to the interior of the vehicle through the outflow port in the ventilation mode.

Additionally, the indoor and outdoor air supply means includes: an intake duct connected with the first and second blowers to communicate with each other and having an indoor air inlet and an outdoor air inlet; a first indoor and outdoor air converting door for selectively opening the indoor air inlet and the outdoor air inlet with respect to the first blower; and a second indoor and outdoor air converting door for selectively opening the indoor air inlet and the outdoor air inlet with respect to the second blower.

In addition, the air-conditioning case includes a cold air passageway, a warm air passageway, a cold air outflow port for introducing the air passing through the cold air passageway to the interior of the vehicle, a cold air discharge port for discharging the air to the outside, a warm air outflow port for introducing the air passing through the warm air passageway to the interior of the vehicle, and a warm air discharge port for discharging the air to the outside of the vehicle. A cold air mode door for opening and closing the cold air outflow port and the cold air discharge port is disposed at one side of the cold air passageway of the air-conditioning case, and a warm air mode door for opening and closing the warm air outflow port and the warm air discharge port is disposed at one side of the warm air passageway of the air-conditioning case.

Moreover, the control unit opens all of the indoor and outdoor air inlets with respect to the first blower, and controls the first indoor and outdoor air converting door so that the indoor air faces the first blower and controls the second indoor and outdoor air converting door so that the outdoor air faces the second blower. The control unit controls the cold air mode door so that the indoor air introduced into the first blower is discharged to the outside through the cold air discharge port and controls the warm air-mode door so that the outdoor air introduced into the second blower is introduced into the interior of the vehicle through the warm air outflow port.

Furthermore, the control unit controls the first indoor and outdoor air converting door and the second indoor and outdoor air converting door to open the indoor air inlet with respect to the first blower and the second blower. The control unit controls the cold air mode door to discharge the indoor air introduced into the first blower to the outside through the cold air discharge port, and controls the warm air mode door to discharge the indoor air introduced into the second blower to the outside through the cold air discharge port.

Additionally, the control unit controls the first indoor and outdoor air converting door and the second indoor and outdoor air converting door to open the outdoor air inlet with respect to the first blower and the second blower. The control unit controls the cold air mode door to introduce the outdoor air introduced into the first blower into the interior of the vehicle through the warm air outflow port, and controls the warm air mode door to introduce the outdoor air introduced into the second blower into the interior of the vehicle through the warm air outflow port.

In another aspect of the present invention, there is provided an air conditioner for a vehicle including: an air-conditioning case having an air inlet disposed at one side to introduce air and a plurality of air outflow port disposed at the other side; a blower mounted at the air inlet of the air-conditioning case and having a blowing fan for introducing indoor air or outdoor air into the air inlet; an indoor and outdoor air supply means connected to one side of the blower and having an indoor air inlet and an outdoor air inlet for introducing indoor air or outdoor air into the blower in a direction different from the direction that the air is introduced into the blower; and a filter unit mounted at a front end of the blower to make air uniformly inhaled and moved to the blowing fan.

Moreover, the blower includes a first blower and a second blower formed to face each other, and the indoor air inlet and the outdoor air inlet of the indoor and outdoor air supply means are formed to be perpendicular to the first blower and the second blower.

Furthermore, the indoor and outdoor air supply means includes: an intake duct connected with the first and second blowers to communicate with each other and having an indoor air inlet and an outdoor air inlet; a first indoor and outdoor air converting door for selectively opening the indoor air inlet and the outdoor air inlet with respect to the first blower; and a second indoor and outdoor air converting door for selectively opening the indoor air inlet and the outdoor air inlet with respect to the second blower.

Additionally, a compressor, a condenser, an expansion means and an evaporator are connected as a refrigerant circulation line, and the air-conditioning case includes a cold air passageway in which the evaporator is mounted to supply cold air passing through the evaporator and warm air passing through the condenser to the interior of the vehicle or discharge the cold air and the warm air to the outside of the vehicle, and a warm air passageway in which the condenser is mounted. The first blower includes: a scroll case mounted at an entrance of the air-conditioning case and connected to the inlet of the cold air passageway to send air; a blowing fan rotatably mounted inside the scroll case; and an inlet ring formed at one side of the scroll case to introduce indoor air and outdoor air. The second blower sends air to the warm air passageway and is spaced from the first blower to face the first blower, and includes: a scroll case connected to the inlet of the warm air passageway; a blowing fan rotatably mounted inside the scroll case; and an inlet ring formed at one side of the scroll case to introduce indoor air and outdoor air. The indoor and outdoor air supply means is mounted and connected to the first and second blowers to supply indoor air and outdoor air in a direction perpendicular to rotary shafts of the blowing fans of the first and second blowers. The filter unit is mounted at a front end of one among the inlet rings in an air inhalation direction to make air uniformly inhaled and moved to the blowing fan.

In addition, the inlet ring is formed at one side of the scroll case with which the intake duct of the indoor and outdoor air supply means is combined, and the inlet ring is formed at one side of the scroll case with which the intake duct of the indoor and outdoor air supply means is combined to face the inlet ring.

Moreover, the filter unit is detachably mounted at a fitting part formed at front ends of the inlet rings.

Furthermore, the filter unit is a mesh filter made of a metallic material.

Additionally, the filter unit is formed in a convex shape in the reverse direction of an air inhalation channel of the blowing fan.

Moreover, the filter unit has a plurality of filter holes, and the filter holes are expanded to get wider toward the blowing fan.

Furthermore, the filter holes are formed in a hexagonal honeycomb shape.

Advantageous Effects

As described above, due to the indoor air ventilation structure of the air conditioner for a vehicle, the air conditioner for a vehicle according to the present invention can fill the interior of the vehicle with fresh air faster than the conventional air conditioner using the extractor.

In detail, the air conditioner for a vehicle according to the present invention can discharge the indoor air of the vehicle to the outside and introduce the outdoor air into the interior of the vehicle using the two blowers. Alternatively, one among the two blowers discharges the indoor air of the vehicle to the outside of the vehicle and the other one introduces the outdoor air to the interior of the vehicle. Therefore, the air conditioner for a vehicle according to the present invention can reduce density of carbon dioxide inside the vehicle, remove exhaust gas from the interior of the vehicle, and enhance fog-up speed through forced ventilation.

Moreover, the air conditioner for a vehicle according to the present invention can make inhalation and flow of the air to the blast fan uniform in order to enhance air blast efficiency since the filter unit is disposed at a front end of the inlet ring of the blower in the air intake direction so that the direction of the air inhaled through the indoor air inlet and the direction of the air introduced into the blast fan are perpendicular to each other.

Furthermore, the air conditioner for a vehicle according to the present invention can enhance air blowing efficiency through uniform inhalation and flow of air to the blowing fans since the filter units are disposed to be refracted along the air inhalation channel and are formed in a streamlined shape so that air is smoothly introduced into the blowing fans.

MODE FOR INVENTION

Figure 1:
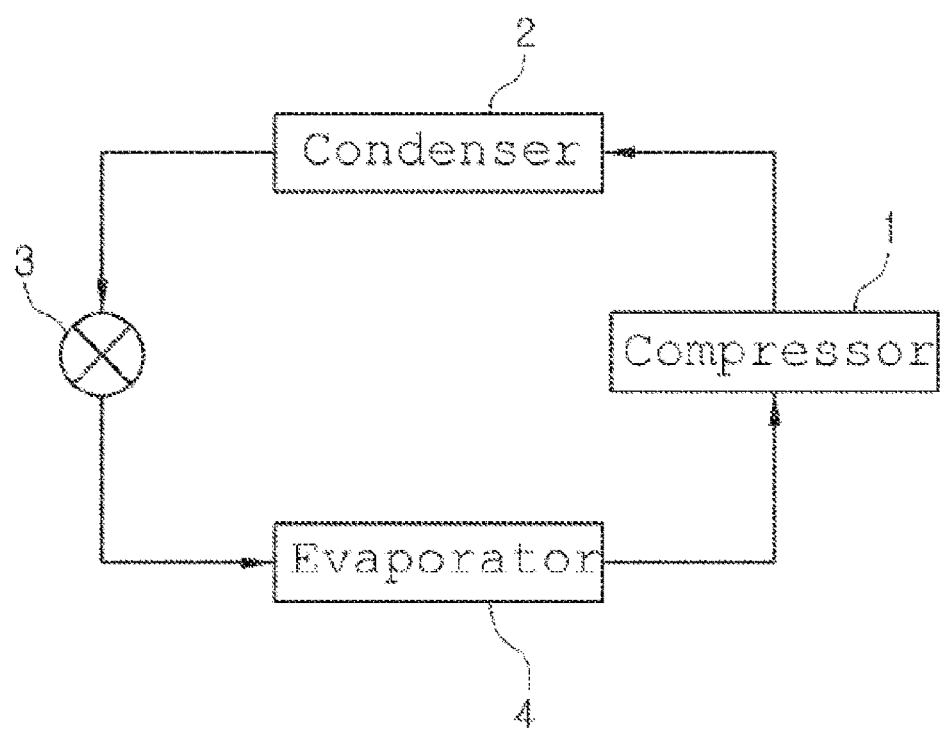
FIG. 1 is a configurative view of a refrigeration cycle of a general air conditioner for a vehicle.
Figure 2:
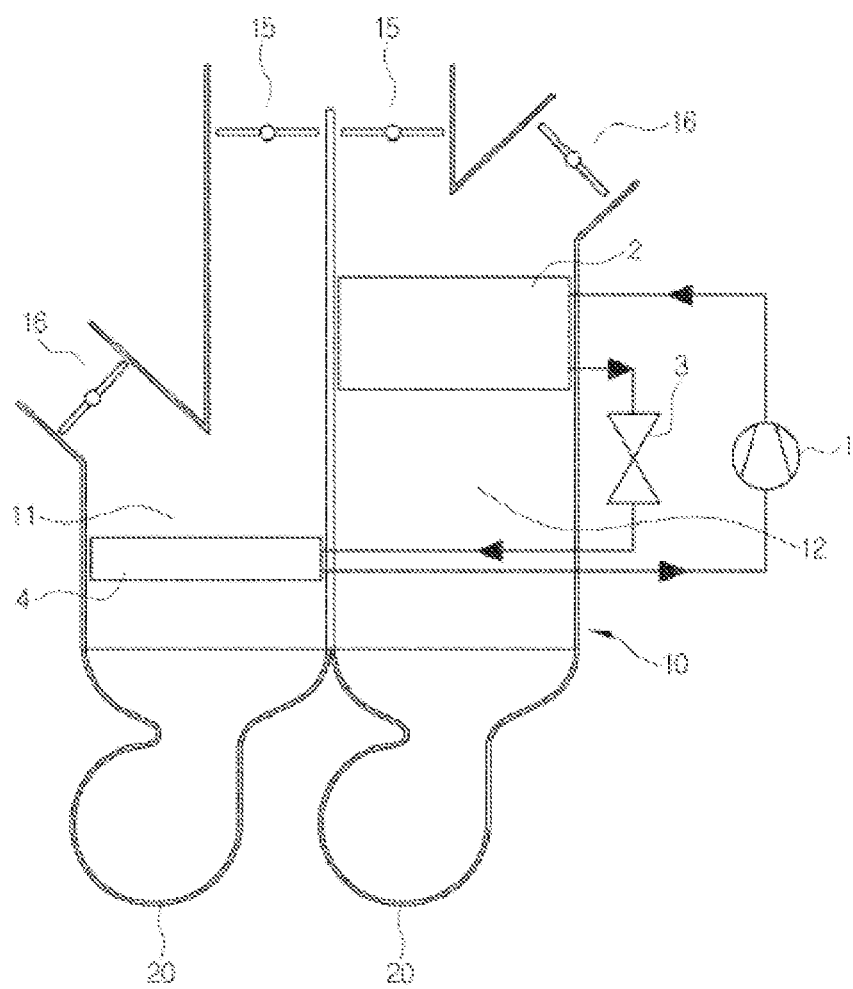
FIG. 2 is a view of a conventional air conditioner for a vehicle.
Figure 3:
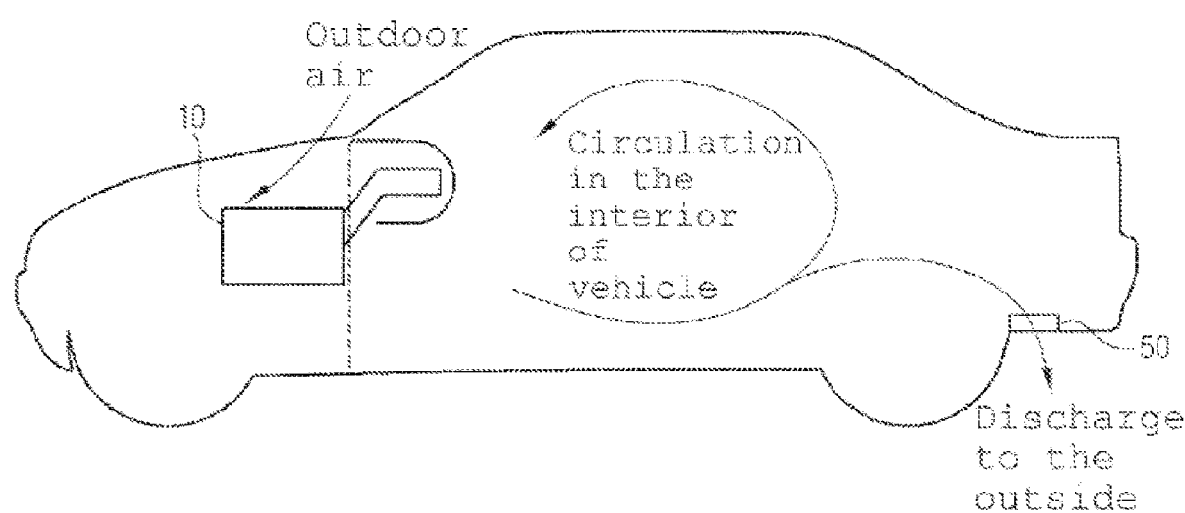
FIG. 3 is a view showing an air flow of the conventional air conditioner in a heating mode.

In order to fully understand the present invention, exemplary embodiments of the invention will be described with reference to the accompanying drawings. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components. A detailed explanation of known related functions and constitutions may be omitted to avoid unnecessarily obscuring the subject matter of the present invention.

Figure 4:
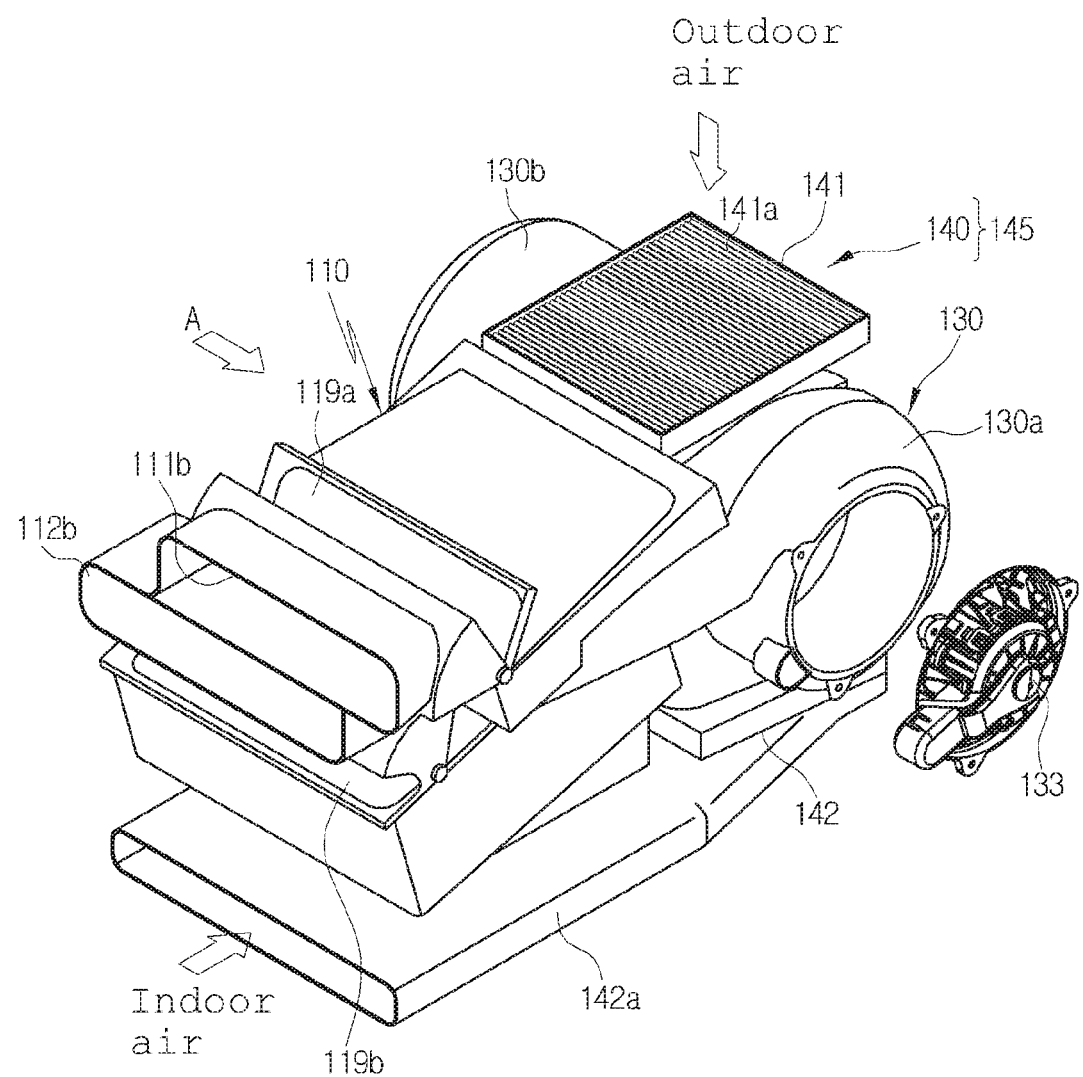
FIG. 4 is a perspective view of an air conditioner for a vehicle according to a first embodiment of the present invention.
Figure 5:
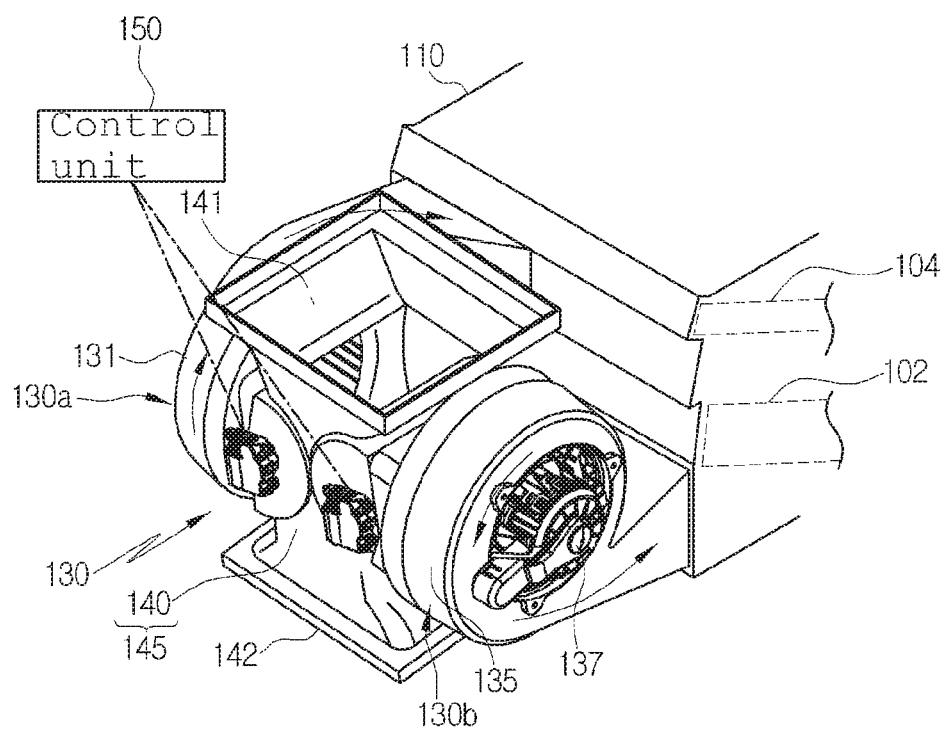
FIG. 5 is a partially perspective view of a blower unit of the air conditioner for a vehicle according to the present invention.

FIG. 4 is a perspective view of an air conditioner for a vehicle according to a first embodiment of the present invention, and FIG. 5 is a partially perspective view of a blower unit of the air conditioner for a vehicle according to the present invention.

As shown in FIGS. 4 and 5, the air conditioner for a vehicle according to the present invention includes a compressor (not shown), a condenser 102, expansion means (not shown) and an evaporator 104, which are connected with one another in sequence through a refrigerant circulation line (not shown), so as to carry out cooling through the evaporator 104 and carry out heating through the condenser 102. Description of the refrigerant circulation process will be omitted since the refrigerant circulation process is obvious to those skilled in the art.

In the above-mentioned refrigerant circulation process, the air blown by a blower unit 130 is introduced into the air-conditioning case 110, is cooled by the evaporative latent heat of the liquid-phase refrigerant circulating inside the evaporator 104, and then, is discharged to the interior of the vehicle in a cooled state through a distribution duct 200, so that the interior of the vehicle is heated. The air blown by the blower unit 130 is introduced into the air-conditioning case 110, is heated by heat radiation of the vapor-phase refrigerant of high-temperature and high-pressure circulating inside the condenser 102 while passing through the condenser 102, and then, is discharged to the interior of the vehicle in a heated state through the distribution duct 200, so that the interior of the vehicle is cooled.

An indoor and outdoor air supply means 145 includes an intake duct 140, which is connected with first and second blowers 130a and 130b to communicate with each other and has an indoor air inlet 142 and an outdoor air inlet 141. Such an indoor and outdoor air supply means 145 will be described later.

The intake duct 140 has the outdoor air inlet 141 for introducing outdoor air and the indoor air inlet 142 for introducing indoor air, and in this instance, preferably, the outdoor air inlet 141 is formed at an upper portion of the intake duct 140 and the indoor air inlet 142 is formed at a lower portion of the intake duct 140.

Figure 6:
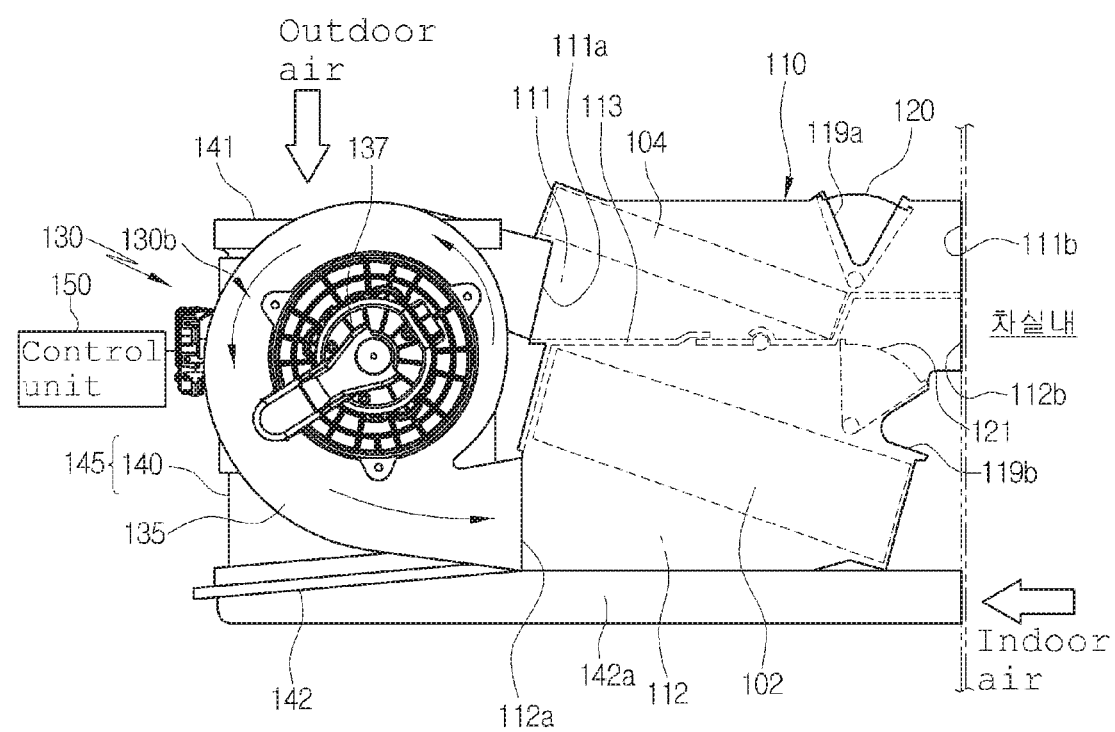
FIG. 6 is a side view seen from an A of FIG. 4.

FIG. 6 is a side view seen from an A of FIG. 4.

As shown in FIG. 6, a cold air passageway 111 and a warm air passageway 112 are formed inside the air-conditioning case 110 to be vertically partitioned from each other by a partition wall 113 which partitions the inside of the air-conditioning case 110. That is, the cold air passageway 111 is formed above the partition wall 113 and the warm air passageway 112 is formed below the partition wall 113.

Furthermore, the evaporator 104 is mounted in the cold air passageway 111, and the condenser is mounted in the warm air passageway 112. Additionally, the evaporator 104 and the condenser 102 are also arranged vertically due to the vertical arrangement of the cold air passageway 111 and the warm air passageway 112.

Inside the air-conditioning case 110, cold air flows in the cold air passageway 111 in which the evaporator 104 is mounted, and warm air flows in the warm air passageway 112 in which the condenser 102 is mounted. The cold air passing through the evaporator 104 and the warm air passing through the condenser 102 are supplied to the interior of the vehicle or are discharged to the outside of the vehicle.

The evaporator 104 is mounted above the partition wall 113 and the condenser 102 is mounted below the partition wall 113, but on the contrary, the evaporator 104 may be mounted below the partition wall 113 and the condenser may be mounted above the partition wall 113.

Moreover, a bypass passageway 114 for communicating the cold air passageway 111 and the warm air passageway 112 with each other is formed to penetrate through the partition wall 113 between the evaporator 104 and the condenser 102, and a bypass door 115 for opening and closing the bypass passageway 114 is mounted in the bypass passageway 114.

That is, inside the air-conditioning case 110 in which the evaporator 104 is arranged below the partition wall 113 and the condenser 102 is arranged above the partition wall 113, the bypass passageway 114 bypasses some of the cold air passing through the evaporator 104 in the cold air passageway 111 to the warm air passageway 112, and the bypass door 115 closes the bypass passageway 114, and selectively opens and closes the bypass passageway 114 in the heating mode.

Therefore, in the state where the bypass passageway 114 is closed by the bypass door 115, in the cooling mode, the cold air cooled by the evaporator 104 while flowing in the cold air passageway 111 is supplied to the interior of the vehicle to cool the interior of the vehicle. In this instance, the air flowing in the warm air passageway 112 is discharged out. In the heating mode, the warm air heated by the condenser 102 while flowing in the warm air passageway 112 is supplied to the interior of the vehicle to heat the interior of the vehicle, and in this instance, the air flowing in the cold air passageway 111 is discharged out.

The outdoor air inlet 141 of the intake duct 140 communicates with the outside of the vehicle, and the indoor air inlet 142 of the intake duct 140 communicates with the interior of the vehicle. In this instance, an indoor air inflow duct 142a for connecting the interior of the vehicle with the indoor air inlet 142 of the intake duct 140 is mounted in the air-conditioning case 110.

In addition, air filters 141a and 142a are respectively mounted at the outdoor air inlet 141 and at the indoor air inlet 142 in order to remove impurities contained in the air introduced into the outdoor air inlet 141 and the indoor air inlet 142.

Moreover, the air-conditioning case 110 includes a cold air outflow port 111b, a cold air discharge port 119a and a cold air mode door 120 at an outlet of the cold air passageway 111, wherein the cold air outflow port 111b discharges the cold air passing through the evaporator 104 to the interior of the vehicle, the cold air discharge port 119a discharges the cold air to the outside of the vehicle, and the cold air mode door 120 is disposed to open and close the cold air outflow port 111b and the cold air discharge port 119a.

Furthermore, the air-conditioning case 110 includes a warm air outflow port 112b, a warm air discharge port 119b, and a warm air mode door 121 at an outlet of the warm air passageway 111, wherein the warm air outflow port 112b discharges the warm air passing through the condenser 104 to the interior of the vehicle, the warm air discharge port 119a discharges the warm air to the outside of the vehicle, and the warm air mode door 121 is disposed to open and close the warm air outflow port 112b and the warm air discharge port 119b.

Figure 7:
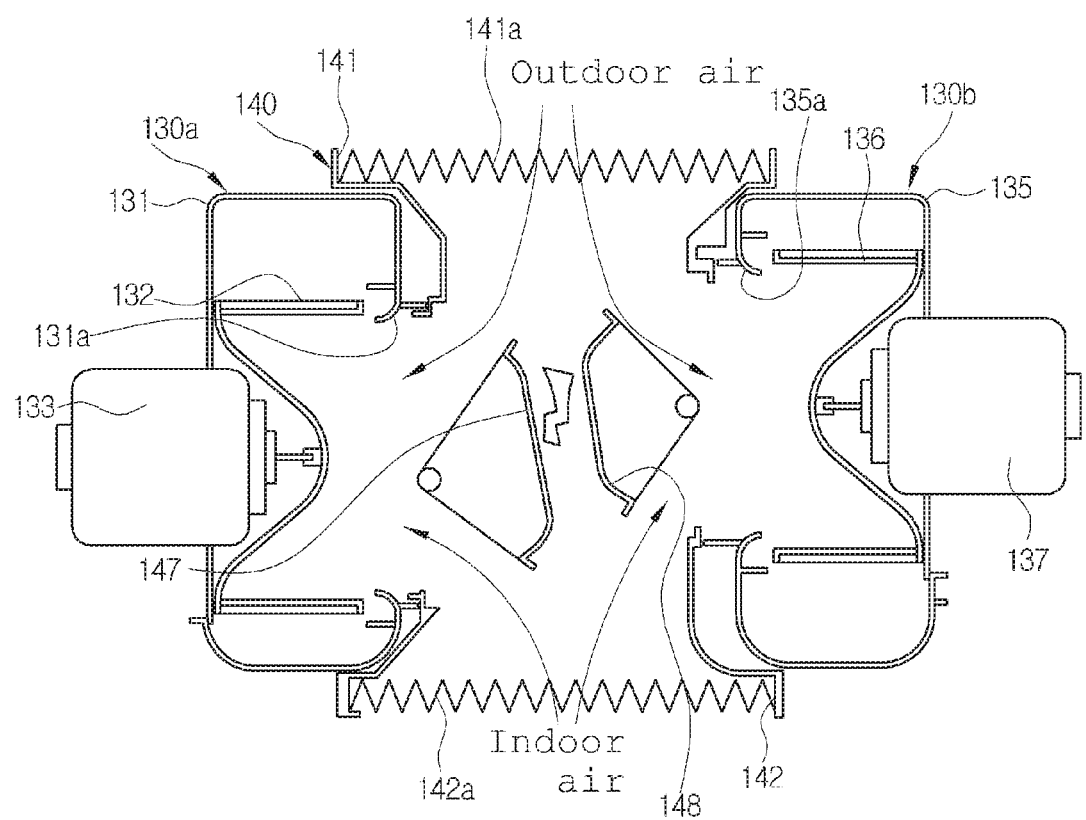
FIG. 7 is a sectional view of the blower unit of the air conditioner for a vehicle according to the present invention.

FIG. 7 is a sectional view of the blower unit of the air conditioner for a vehicle according to the present invention.

The blower unit 130 mounted at an inlet side of the air-conditioning case 110 includes: a first blower 130a connected and mounted to the inlet 111a of the cold air passageway 111 of the air-conditioning case 110 to blow air to the cold air passageway 111; and a second blower 130b connected and mounted to the inlet 112a of the warm air passageway 112 of the air-conditioning case 110 to blow air to the warm air passageway 112.

In detail, as shown in FIG. 7, the first blower 130a and the second blower 130b are mounted to be spaced apart from each other in the width direction of the vehicle as shown in FIG. 5. Of course, the first blower 130a and the second blower 130b may be arranged in various ways in the state where the first blower 130a and the second blower 130b are respectively connected to the inlet 111a of the cold air passageway 111 and the inlet 112a of the warm air passageway 112.

The first blower 130a includes: a scroll case 131 connected to the inlet 111a of the cold air passageway 111 of the air-conditioning case 110; a blowing fan 132 rotatably mounted inside the scroll case 131; an inlet ring 131a formed at one side of the scroll case 131 to introduce indoor air and outdoor air; and a motor 133 mounted at the other side of the scroll case 131 to rotate the blowing fan 132.

The inlet ring 131a is formed at one side of the scroll case 131 with which the intake duct 140 of the indoor and outdoor air supply means 145 is combined.

The second blower 130b includes: a scroll case 135 connected to the inlet 112a of the warm air passageway 112 of the air-conditioning case 110; a blowing fan 136 rotatably mounted inside the scroll case 135; an inlet ring 135a formed at one side of the scroll case 135 to introduce indoor air and outdoor air; and a motor 137 mounted at the other side of the scroll case 135 to rotate the blowing fan 136.

The inlet ring 135a is formed at one side of the scroll case 135 with which the intake duct 140 of the indoor and outdoor air supply means 145 is combined.

Moreover, the inlet ring 131a of the first blower 130a and the inlet ring 135a of the second blower 130b are formed to face each other.

In the meantime, the scroll cases 131 and 135 of the first and second blowers 130a and 130b are formed in a scroll shape on the basis of the blowing fans 132 and 136 mounted therein.

Furthermore, the indoor and outdoor air supply means 145 for supplying indoor air and outdoor air is connected and mounted to the first and second blowers 130a and 130b.

Referring to FIGS. 5 and 7, the indoor and outdoor air supply means 145 includes: the intake duct 140 connected to communicate with the first and second blowers 130a and 130b and having the indoor air inlet 142 and the outdoor air inlet 141; a first indoor and outdoor air converting door 147 for selectively opening the indoor air inlet 142 and the outdoor air inlet 141 with respect to the first blower 130a; and a second indoor and outdoor air converting door 148 for selectively opening the indoor air inlet 142 and the outdoor air inlet 141 with respect to the second blower 130b.

One intake duct 140 is mounted between the first blower 130a and the second blower 130b, so that the first and second blowers 130a and 130b use the one intake duct 140 commonly.

As described above, because the intake duct 140 is mounted between the first blower 130a and the second blower 130b, namely, because the system using two blowers 130a and 130b operating individually uses just one intake duct 140, it can maximize spatial efficiency, and reduce the size and costs of the system.

Meanwhile, the drawing illustrates that the indoor and outdoor air supply means 145 is arranged between the first blower 130a and the second blower 130b, but it is also possible that the first blower 130a and the second blower 130b are arranged at one side together and the indoor and outdoor air supply means 145 is arranged at the other side, namely, at sides of the first and second blowers 130a and 130b, at an entrance of the air-conditioning case 110.

The first indoor and outdoor air converting door 147 and the second indoor and outdoor air converting door 148 are respectively mounted between the indoor air inlet 142 and the outdoor air inlet 141 of the intake duct 140.

The first indoor air converting door 147 is a dome-shaped door and is arranged at the inlet of the first blower 130a to selectively open the indoor air inlet 142 and the outdoor air inlet 141 with respect to the first blower 130a. The second indoor air converting door 148 is a dome-shaped door and is arranged at the inlet of the second blower 130b to selectively open the indoor air inlet 142 and the outdoor air inlet 141 with respect to the second blower 130b.

As described above, one intake duct 140 is mounted between the first and second blowers 130a and 130b, and the first and second indoor and outdoor air converting doors 147 and 148 are mounted inside the intake duct 140, so that the indoor air and outdoor air introduced into the indoor and outdoor air inlets 141 and 142 of the intake duct 140 can be selectively supplied to the evaporator and the condenser through the first and second blowers 130a and 130b.

Figure 8:
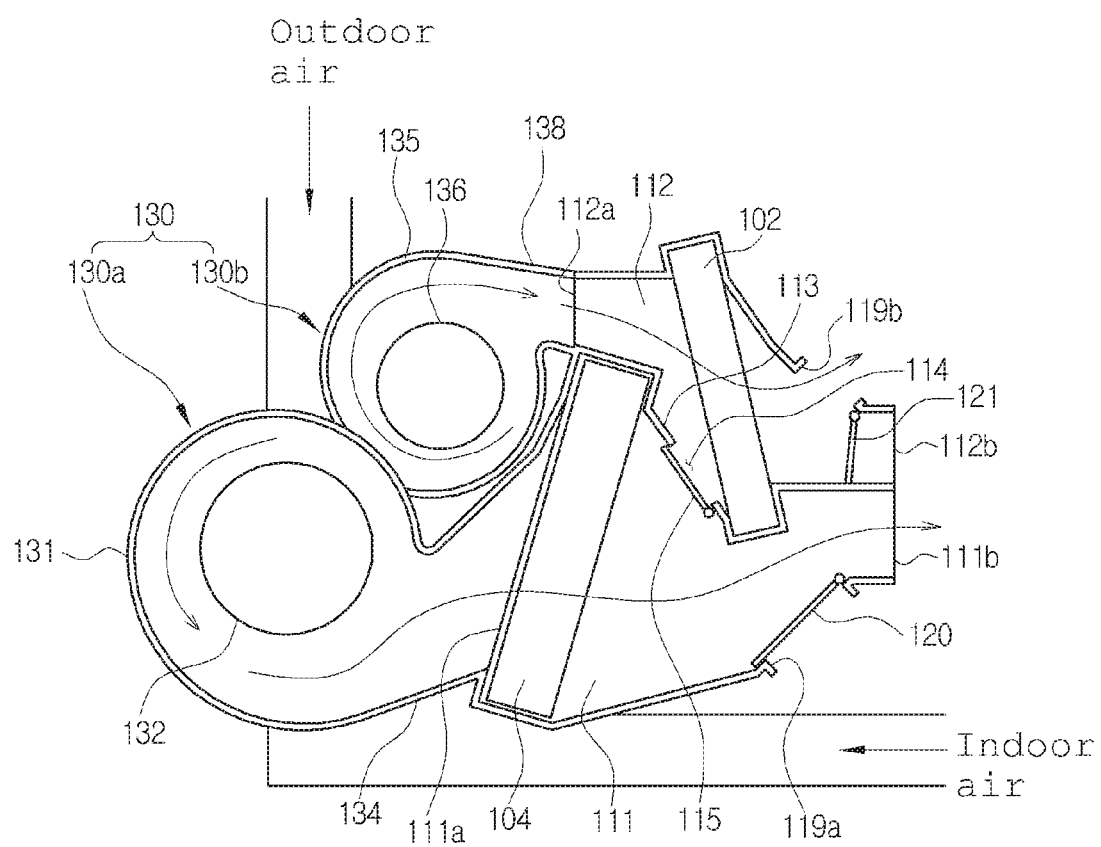
FIG. 8 is a sectional view showing a cooling mode of the air conditioner for a vehicle according to the present invention.

FIG. 8 is a sectional view showing a cooling mode of the air conditioner for a vehicle according to the present invention.

As shown in FIG. 8, in the cooling mode, the cold air outflow port 111b and the warm air discharge port 119b are opened, and the air flowing in the cold air passageway 111 is changed into cold air while passing through the evaporator 104, and then, is supplied to the interior of the vehicle through the cold air outflow port 111b to cool the interior of the vehicle. In this instance, the air flowing in the warm air passageway 112 is changed into warm air while passing through the condenser 102, and then, is discharged to the outside of the vehicle through the warm air discharge port 119b.

Figure 9:
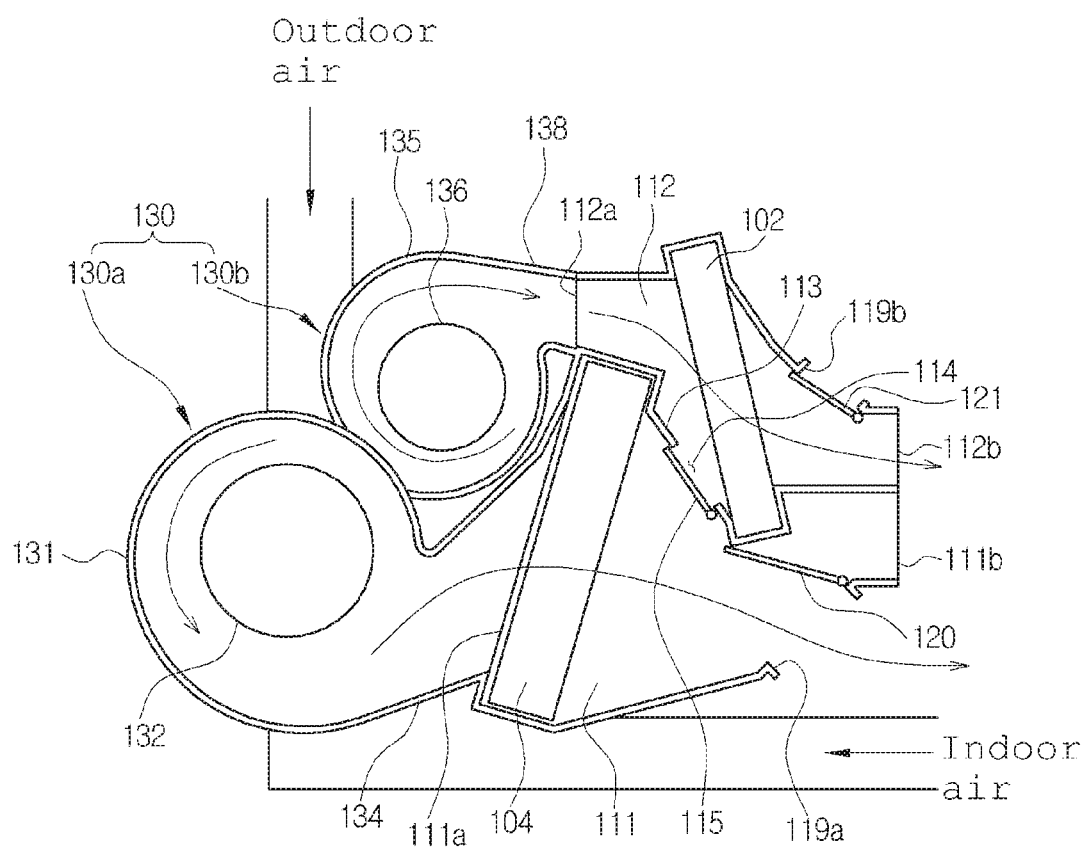
FIG. 9 is a sectional view showing a heating mode of the air conditioner for a vehicle according to the present invention.

FIG. 9 is a sectional view showing a heating mode of the air conditioner for a vehicle according to the present invention.

As shown in FIG. 9, in the heating mode, the warm air outflow port 112b and the cold air discharge port 119a are opened, and the air flowing in the warm air passageway 112 is changed into warm air while passing through the condenser 102, and then, is supplied to the interior of the vehicle through the warm air outflow port 112b to heat the interior of the vehicle. In this instance, the air flowing in the cold air passageway 111 is changed into cold air while passing through the evaporator 104, and then, is discharged to the outside of the vehicle through the cold air discharge port 119a.

Figure 10:
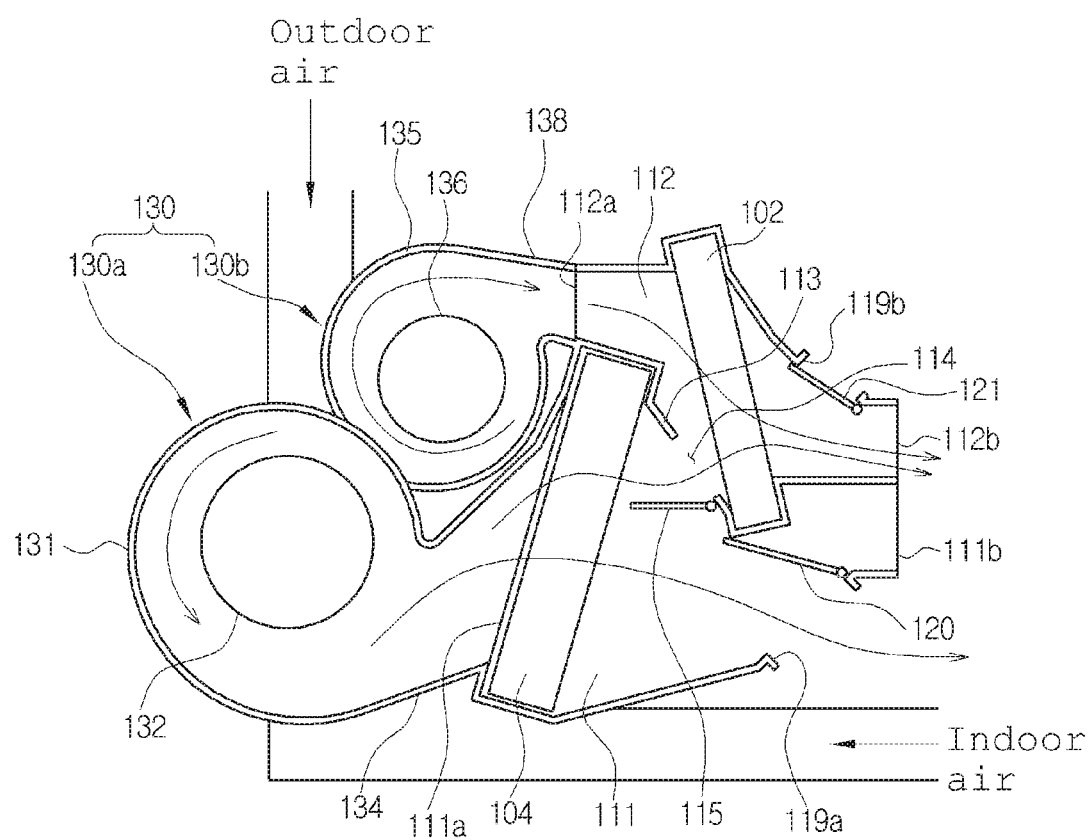
FIG. 10 is a sectional view showing a dehumidifying and heating mode of the air conditioner for a vehicle according to the present invention.

FIG. 10 is a sectional view showing a dehumidifying and heating mode of the air conditioner for a vehicle according to the present invention.

Moreover, in the heating mode, if dehumidification of the interior of the vehicle is needed, that is, in a dehumidification mode, the bypass door 115 opens the bypass passageway 114. In this instance, some of the air cooled and dehumidified by the evaporator 104 while flowing in the cold air passageway 111 is bypassed toward the warm air passageway 112 through the bypass passageway 114, passes through the condenser 102, and then, is supplied to the interior of the vehicle in order to dehumidify and heat the interior of the vehicle.

On the same principle, some of the warm air passing through the condenser 102 is bypassed toward the cold air passageway 111 through the bypass passageway 114, and passes through the evaporator 104 to prevent frosting of the evaporator 104. Of course, as described later, indoor air, namely, humidified high temperature air, may be supplied to the evaporator 104 to prevent frosting of the evaporator 104.

Figure 11:
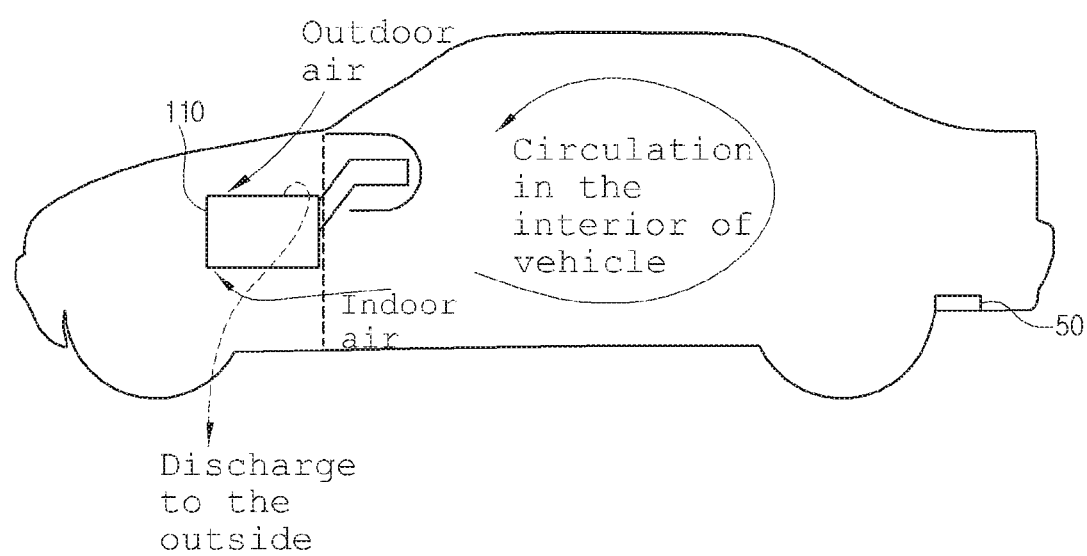
FIG. 11 is a view showing an air flow in a vehicle in which the air conditioner according to the present invention is mounted.

FIG. 11 is a view showing an air flow in a vehicle in which the air conditioner according to the present invention is mounted.

As shown in FIG. 11, the air-conditioning case 110 and the blower unit 130 are mounted on the outer face of a partition wall which forms a passenger room inside the vehicle, for instance, may be mounted in an engine room of the vehicle.

Additionally, an extractor 50 is mounted in the vehicle in order to discharge the indoor air to the outside of the vehicle. The extractor 50 is opened by a differential pressure between the interior of the vehicle and the outside of the vehicle and is mounted in the trunk of the vehicle. In the meantime, a detailed description of the extractor 50 will be omitted since the extractor 50 is well-known.

Therefore, when cold air or warm air is supplied to the interior of the vehicle through the air-conditioning case 110, the extractor 50 is opened by the differential pressure between the interior of the vehicle and the outside, and in this instance, a fixed quantity of the indoor air inside the vehicle is discharged to the outside of the vehicle through the extractor 50. In the meantime, as described in the background art, ventilation through the extractor 50 is unsuitable for rapid ventilation of the interior of the vehicle.

Especially, the air conditioner for a vehicle according to the present invention has not only the heating mode, the cooling mode and the dehumidification and heating mode but also a ventilation mode. The ventilation mode functions to rapidly ventilate the interior of the vehicle using all of the first and second blowers 130a and 130b disposed in the air-conditioning case 110. Especially, because the first and second blowers 130a and 130b and the mode door are operated in the state where the compressor is not operated, the ventilation mode is especially suitable for ventilation.

Therefore, in the ventilation mode, a control unit 150 is mounted to control the interior of the vehicle into a desired ventilation mode by controlling the indoor and outdoor air supply means 145 and various modes.

The ventilation mode according to the present invention is very effective in that it can fill the interior of the vehicle with fresh air faster than the ventilation through the extractor 50 performed in the conventional air conditioner.

The ventilation mode according to the present invention will be described with reference to the drawings.

Figure 12A:
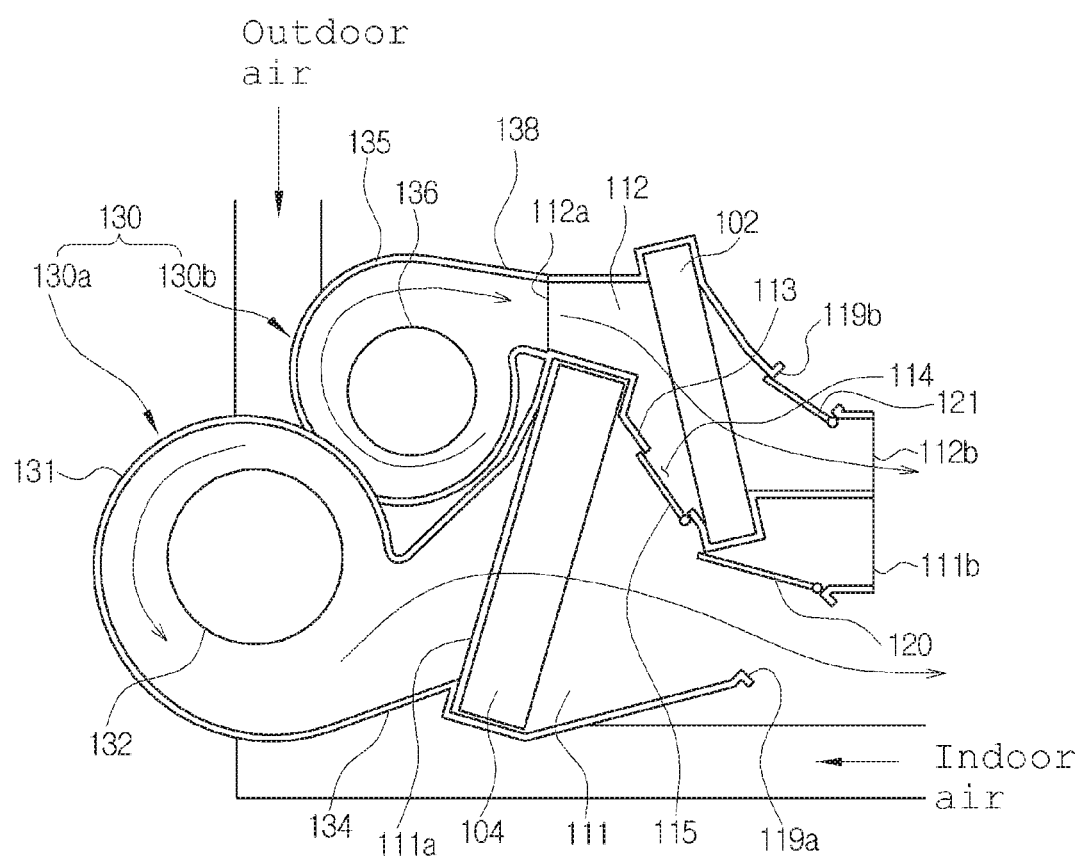
FIG. 12a is a sectional view of the air conditioner for a vehicle in order to describe a first ventilation mode of the air conditioner according to the present invention.
Figure 12B:
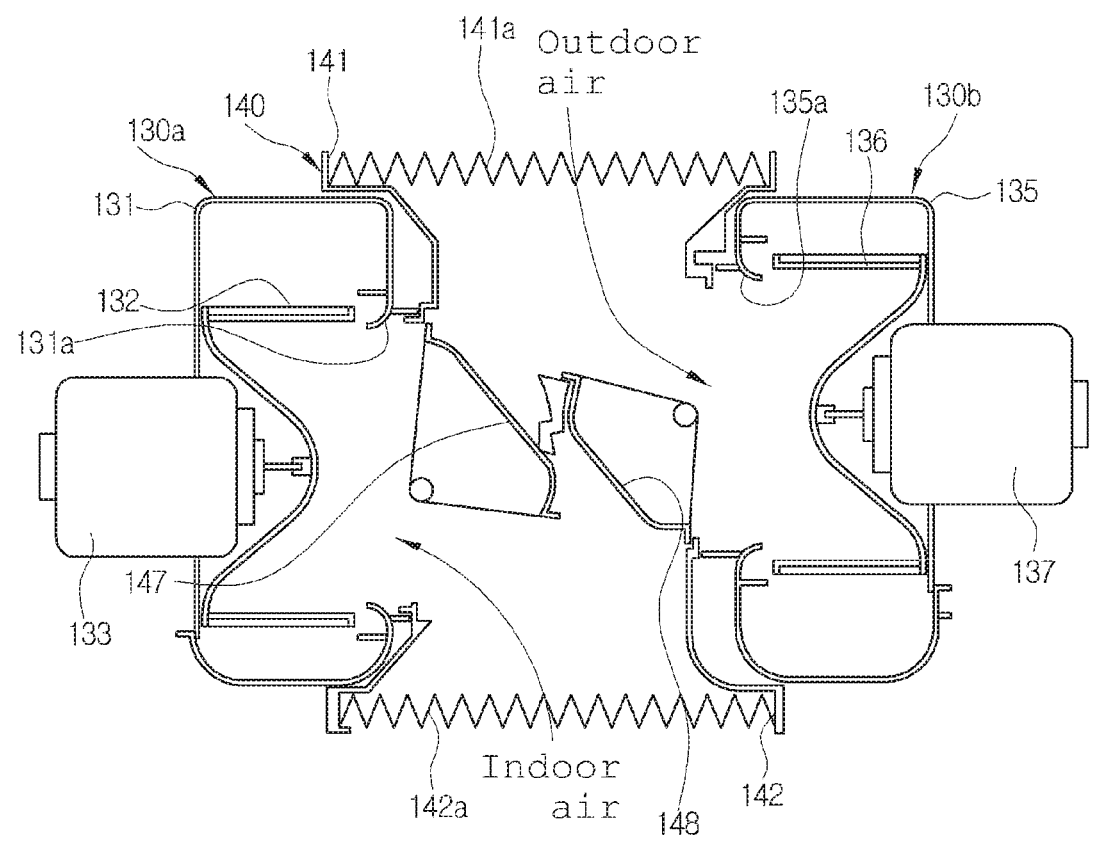
FIG. 12b is a sectional view of the blower unit of the air conditioner for a vehicle in order to describe the first ventilation mode of the air conditioner according to the present invention.

FIG. 12a is a sectional view of the air conditioner for a vehicle in order to describe the first ventilation mode of the air conditioner according to the present invention, and FIG. 12b is a sectional view of the blower unit of the air conditioner for a vehicle in order to describe the first ventilation mode of the air conditioner according to the present invention.

In the first ventilation mode according to the present invention, the first blower 130a discharges indoor air of the vehicle to the outside, and the second blower 130b introduces outdoor air into the vehicle. For instance, the first ventilation mode may be use when density of carbon dioxide causing drowsiness during a long drive increases in the interior of the vehicle. In this instance, a carbon dioxide density sensor is separately disposed in the interior of the vehicle, and the control unit 150 receives a density value from the density sensor and actuates a first ventilation mode continuously or at regular intervals till the density value becomes lower than a set value if the density value is higher than the set value.

In detail, as shown in FIGS. 12 and 12b, in the first ventilation mode, the first indoor and outdoor air converting door 147 rotates to close an outdoor air inflow passageway so that indoor air can flow to the first blower 130a. Moreover, the second indoor and outdoor air converting door 148 rotates to close an indoor air inflow passageway so that outdoor air can flow to the second blower 130b.

In the first ventilation mode, the control unit 150 opens all of the indoor air inlet 142 and the outdoor air inlet 141 with respect to the first blower 130a, and in this instance, controls the first indoor and outdoor air converting door 147 so that the indoor air faces the first blower 130a and controls the second indoor and outdoor air-converting door 148 so that the outdoor air faces the second blower 130b.

Additionally, the control unit 150 controls the cold air mode door 120 so that the indoor air introduced to the first blower 130a is discharged to the outside through the cold air discharge port 119a, and controls the warm air mode door 121 so that the outdoor air introduced to the second blower 130b is introduced into the interior of the vehicle through the warm air outflow port 112b.

In such a first ventilation mode, the air conditioner according to the present invention can rapidly remove unpleasant smells, such as food smells, or carbon dioxide causing drowsiness.

Figure 13A:
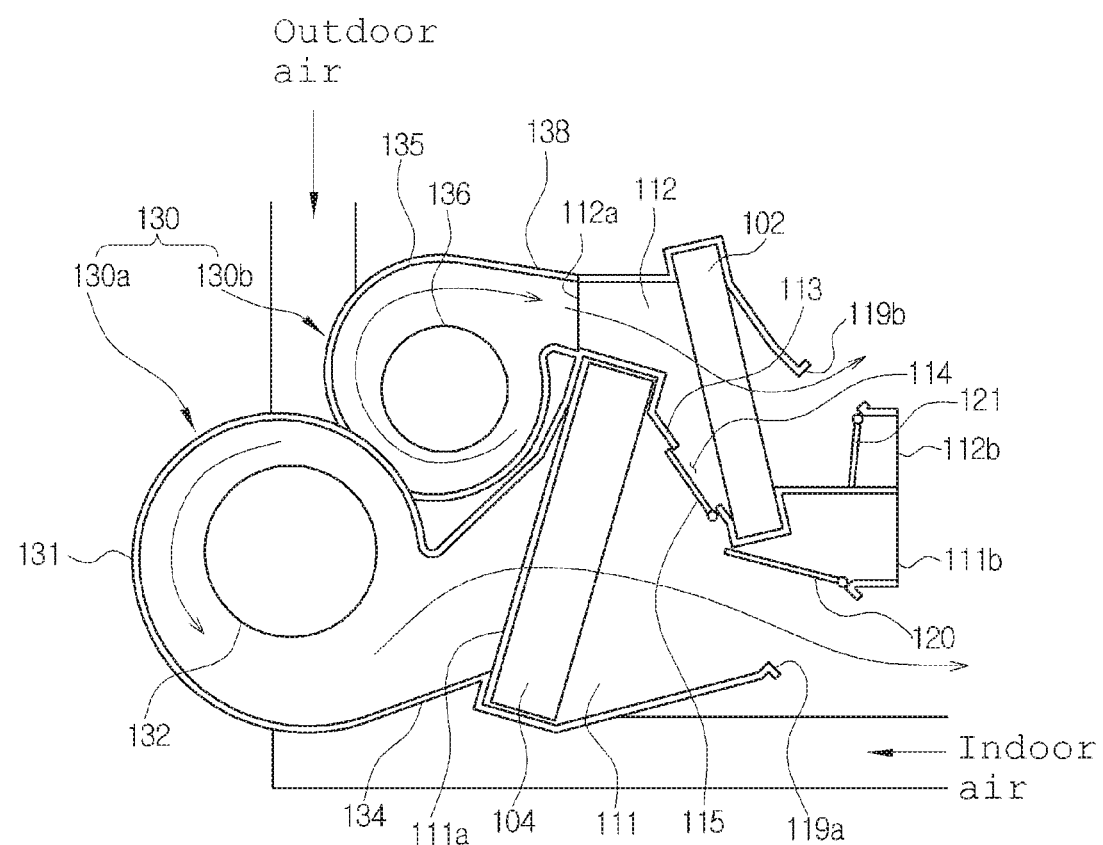
FIG. 13a is a sectional view of the air conditioner for a vehicle in order to describe a second ventilation mode of the air conditioner according to the present invention.
Figure 13B:
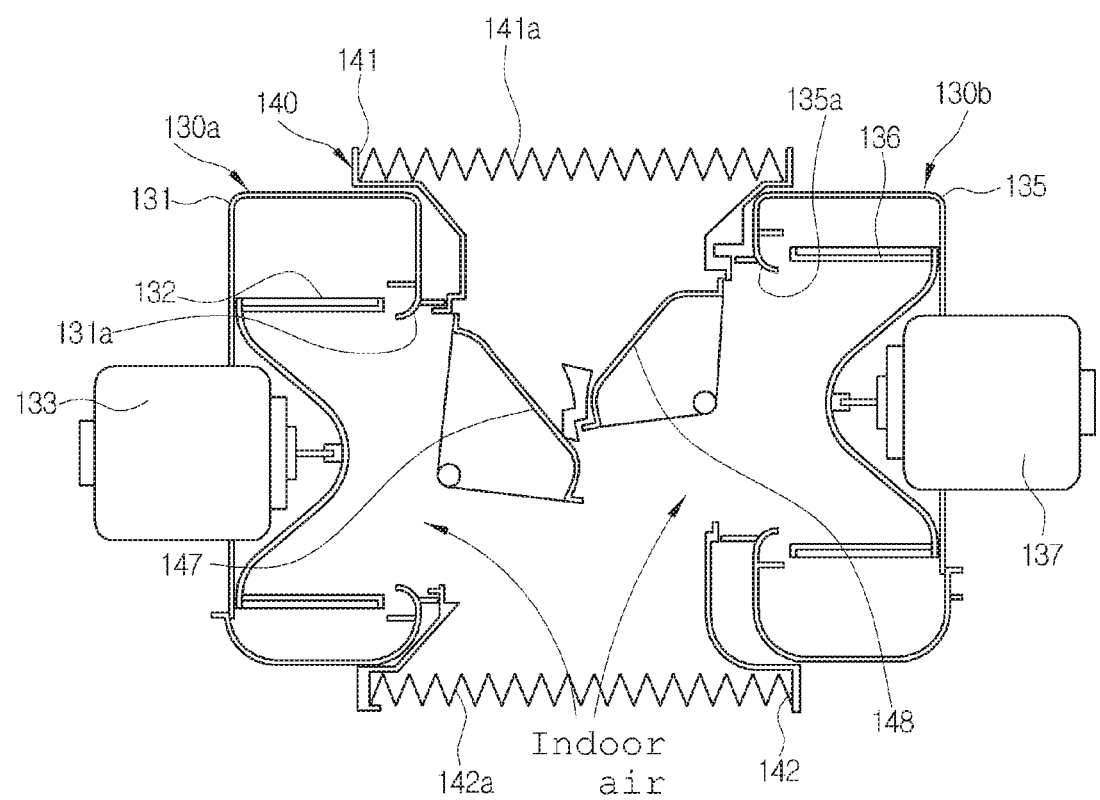
FIG. 13b is a sectional view of the blower unit of the air conditioner for a vehicle in order to describe the second ventilation mode of the air conditioner according to the present invention.

FIG. 13*a* is a sectional view of the air conditioner for a vehicle in order to describe a second ventilation mode of the air conditioner according to the present invention, and FIG. 13*b* is a sectional view of the blower unit of the air conditioner for a vehicle in order to describe the second ventilation mode of the air conditioner according to the present invention.

In the second ventilation mode according to the present invention, all of the first blower 130*a* and the second blower 130*b* discharge the indoor air to the outside, and for instance, the second ventilation mode may be applied in a situation that it is required to rapidly ventilate the interior of the vehicle due to introduction of exhaust gas.

In detail, as shown in FIGS. 13*a* and 13*b*, in the second ventilation mode, the first indoor and outdoor air converting door 147 and the second indoor and outdoor air converting door 148 rotate to close the outdoor air inflow passageway so that the indoor air can be introduced to the first blower 130*a* and the second blower 130*b*.

In this instance, in the second ventilation mode, the control unit 150 controls the first indoor and outdoor air converting door 147 and the second indoor and outdoor air converting door 148 to open the indoor air inlet 142 with respect to the first blower 130*a* and the second blower 130*b*.

Moreover, the control unit 150 controls the cold air mode door 120 so that the indoor air introduced to the first blower 130*a* is discharged to the outside through the cold air discharge port 119*a*, and controls the warm air mode door 121 so that the indoor air introduced to the second blower 130*b* is also discharged to the outside through the cold air discharge port 119*a*.

Furthermore, for a long parking in summer, the control unit 150 can operate the second ventilation mode on a regular cycle through scheduling to discharge warm indoor air to the outside. For instance, a temperature sensor may be disposed in the interior of the vehicle to measure indoor temperature, and the control unit 150 receives a value of the temperature sensor and actuates the second ventilation mode continuously or at regular intervals till the density value becomes lower than a set value if the density value is higher than the set value.

Figure 14A:
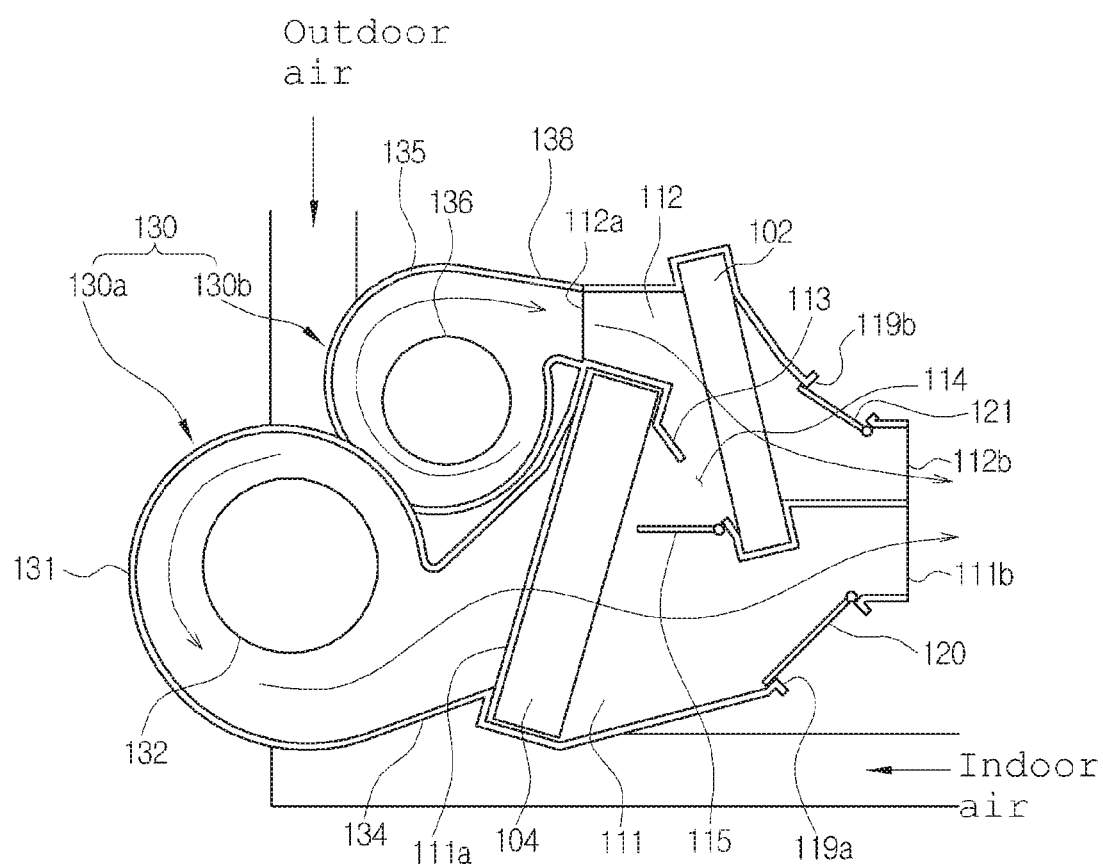
FIG. 14a is a sectional view of the air conditioner for a vehicle in order to describe a third ventilation mode of the air conditioner according to the present invention.
Figure 14B:
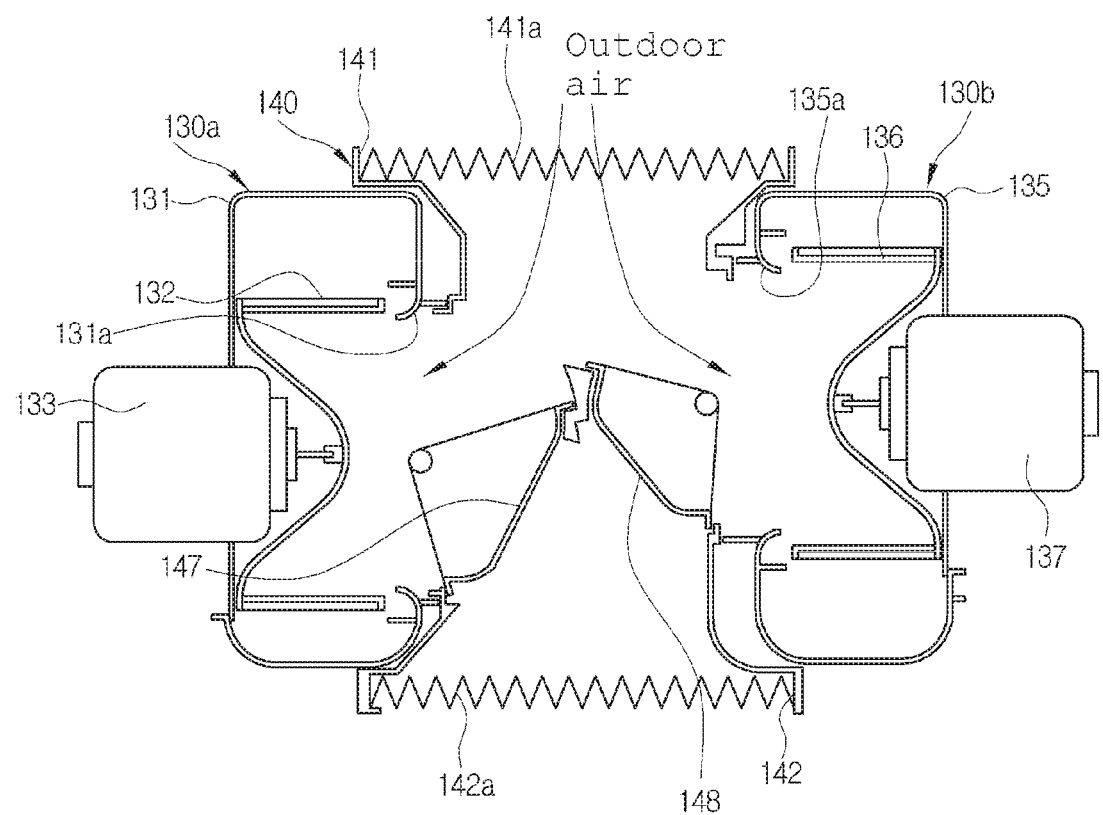
FIG. 14b is a sectional view of the blower unit of the air conditioner for a vehicle in order to describe the third ventilation mode of the air conditioner according to the present invention.

FIG. 14*a* is a sectional view of the air conditioner for a vehicle in order to describe a third ventilation mode of the air conditioner according to the present invention, and FIG. 14*b* is a sectional view of the blower unit of the air conditioner for a vehicle in order to describe the third ventilation mode of the air conditioner according to the present invention.

In the third ventilation mode according to the present invention, all of the first blower 130*a* and the second blower 130*b* introduce the outdoor air to the interior of the vehicle. For instance, the third ventilation mode may be applied in a situation where a user wants to raise fog-up speed through forced ventilation.

In detail, as shown in FIGS. 14*a* and 14*b*, in the third ventilation mode, the first indoor and outdoor air converting door 147 and the second indoor and outdoor air converting door 148 rotate to close the indoor air inflow passageway so that the outdoor air can be introduced to the first blower 130*a* and the second blower 130*b*.

In this instance, the control unit 150 controls the first indoor and outdoor air converting door 147 and the second indoor and outdoor air converting door 148 to open the outdoor air inlet 141 with respect to the first blower 130*a* and the second blower 130*b*.

Additionally, the control unit 150 controls the cold air mode door 120 so that the outdoor air introduced to the first blower 130*a* is introduced into the interior of the vehicle through the warm air outflow port 112*b*, and controls the warm air mode door 121 so that the outdoor air introduced to the second blower 130*b* is introduced into the interior of the vehicle through the warm air outflow port 112*b*.

In this instance, in the third ventilation mode, the control unit 150 can control the evaporator 104 to be operated in order to raise fog-up speed.

In addition, the air conditioner according to the present invention can perform more effective ventilation through sequential combination of the first, second and third ventilation modes. Such sequential combination can be realized through the control unit 150 by a driver's control of a button (not shown) disposed in the vehicle.

For instance, the air conditioner first operates the second ventilation mode to rapidly discharge the indoor air of the vehicle to the outside, and then, converts into the first ventilation mode in order to lower density of carbon dioxide in the interior of the vehicle, thereby preventing drowsiness during driving.

As another example, the air conditioner first operates the second ventilation mode to rapidly discharge the indoor air of the vehicle to the outside, and then, converts into the third ventilation mode in order to rapidly remove bad smell of the indoor air of the vehicle.

As a further example, the air conditioner first operates the third ventilation mode to rapidly introduce outdoor air to the interior of the vehicle, and then, converts into the first ventilation mode in order to increase fog-up speed and prevent drowsiness during driving.

Finally, the air conditioner first operates the third ventilation mode to rapidly introduce outdoor air to the interior of the vehicle, converts into the second ventilation mode to rapidly discharge the indoor air of the vehicle to the outside, and then, converts into the first ventilation mode. As described above, the air conditioner for a vehicle according to the present invention can vary the ventilation modes according to the driver's setting.

Hereinafter, the air conditioner for a vehicle according to another embodiment of the present invention will be described in detail.

Figure 15:
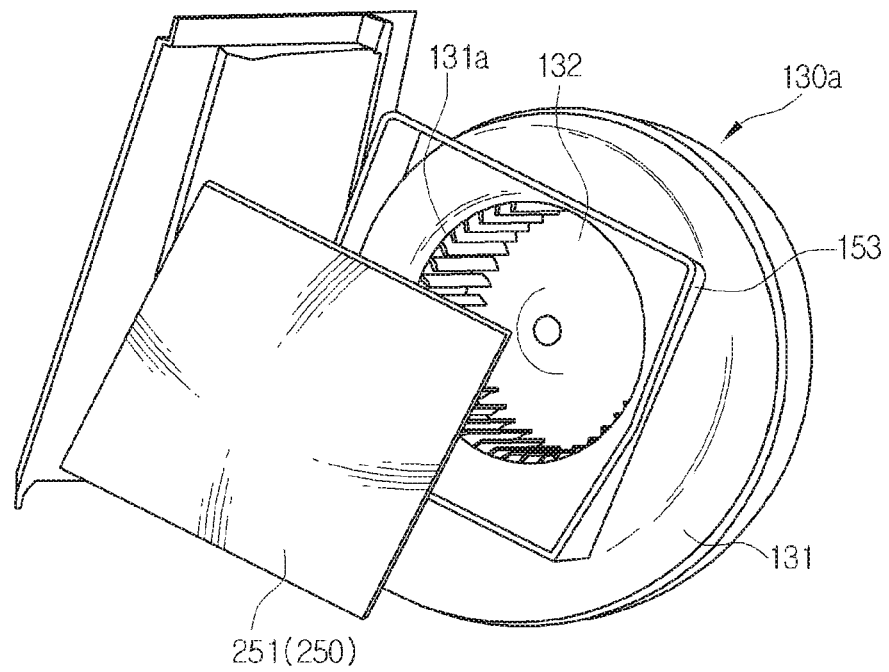
FIG. 15 is a perspective view showing a state where a filter unit is disposed in front of an inlet ring of the air conditioner according to the present invention.
Figure 16:
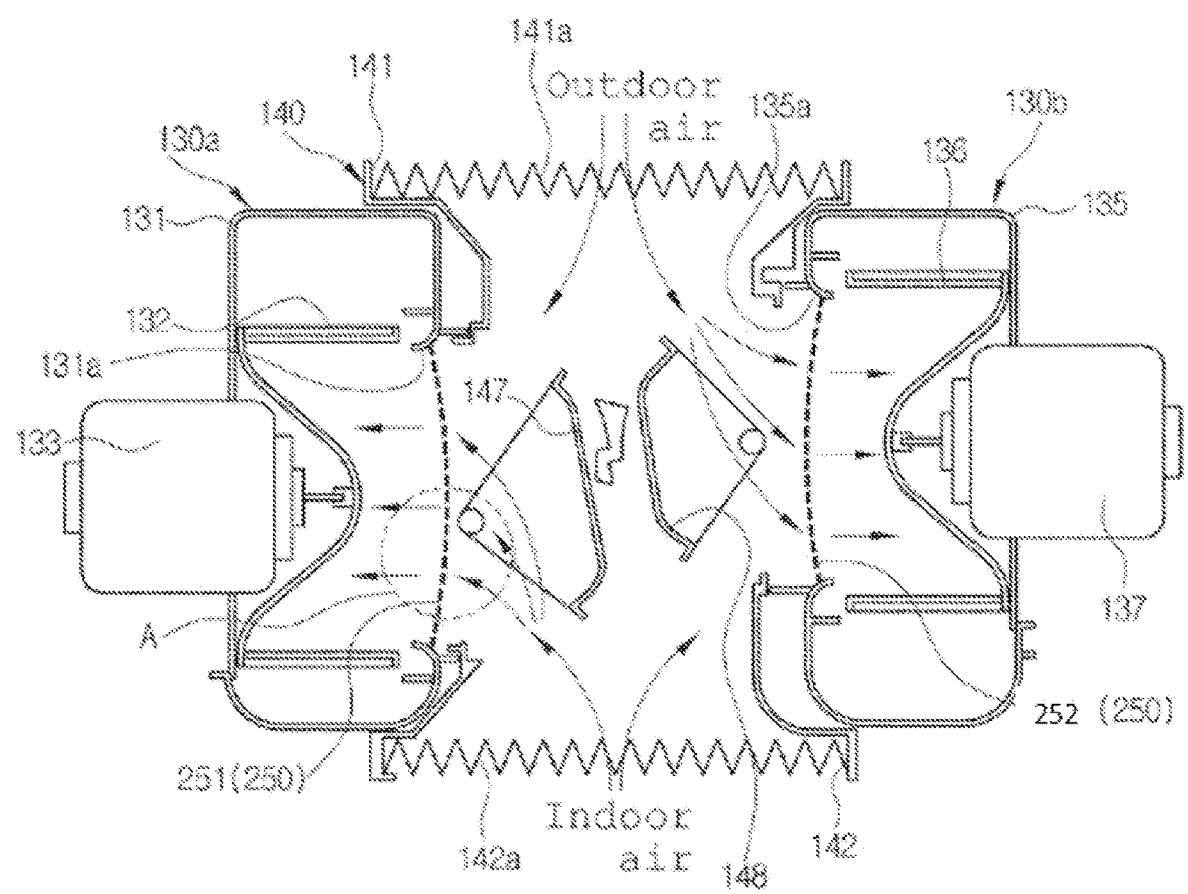
FIG. 16 is a sectional view showing the blower unit of the air conditioner to which the filter unit of FIG. 15 is applied.

FIG. 15 is a perspective view showing a state where a filter unit is disposed in front of an inlet ring of the air conditioner according to the present invention, and FIG. 16 is a sectional view showing the blower unit of the air conditioner to which the filter unit of FIG. 15 is applied.

As shown in FIGS. 15 and 16, a filter unit 250 is disposed at a front end of the inlet ring 131*a* of the first blower 130*a* in an air intake direction. In the same way, another filter unit 250 is disposed at a front end of the inlet ring 135*a* of the second blower 130*b*. That is, the filter unit 250 may be divided into a first filter 251 disposed at the front end of the inlet ring 131*a* of the first blower 130*a* and a second filter 252 disposed at the front end of the inlet ring 135*a* of the second blower 130*b*.

For instance, a direction of the air inhaled through the indoor air inlet 142 and a direction of the air introduced to the blowing fan 132 are formed to be perpendicular to each other. Because an intake air amount of one side of the blowing fan 132 near to the indoor air inlet 142 and an intake air amount of the other side of the blowing fan 132 far from the indoor air inlet 142 are different from each other, it is difficult to make inhalation and flow of the air to the blowing fan 132 uniform. In this instance, inhalation and flow of the air to the blowing fan 136 is the same as the above.

In this instance, the filter unit 250 functions to uniformly change the flow direction of the air inhaled through the outdoor air inlet 141 and the indoor air inlet 142 by the blowing fans to face the blowing fans.

For instance, the filter unit 250 is a mesh filter made of a metallic material. In this instance, the metal mesh filter is a filter using wire mesh that wires are woven in a fixed form. According to characteristics, meshes with different sizes or with different weaving methods may be manufactured to be overlapped in many folds. Moreover, the filter unit 250 may be fit into a fitting part 153 formed at the front end of the inlet ring 131*a*, and is detachable and replaceable.

Figure 17:
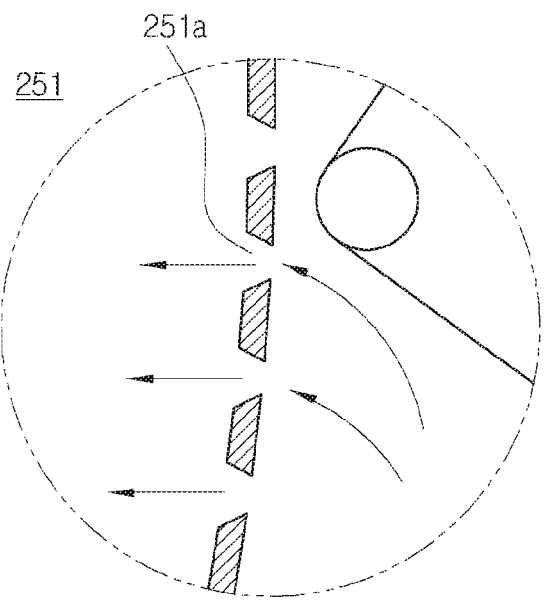
FIG. 17 is a sectional view showing a filter unit according to a second embodiment of the present invention.

FIG. 17 is a sectional view showing a filter unit according to a second embodiment of the present invention.

As shown in FIG. 17, the filter unit 250 is disposed to be refracted along an air inhalation channel, and may be formed in a streamlined shape for a smooth introduction of the air to the blowing fans 132 and 136. For instance, the filter unit 250 may be formed in a convex shape in the reverse direction of the air inhalation channel of the blowing fans 132*a* and 136.

Furthermore, the first filter 251 has a plurality of filter holes 251*a*, and the filter holes 251*a* are expanded to get wider toward the blowing fan 132. The air inhalation channel directing from the indoor air inlet 142 to the blowing fan 132 illustrated in FIG. 16 is formed in the top-left direction from the lower portion. In this instance, the air channel in the top-left direction may horizontally enter into the blowing fan 132 after colliding against the gradually expanded filter holes 251*a*. Therefore, the channel of the air inhaled to the blowing fan 132 is formed uniformly so as to enhance blowing performance.

Figure 18:
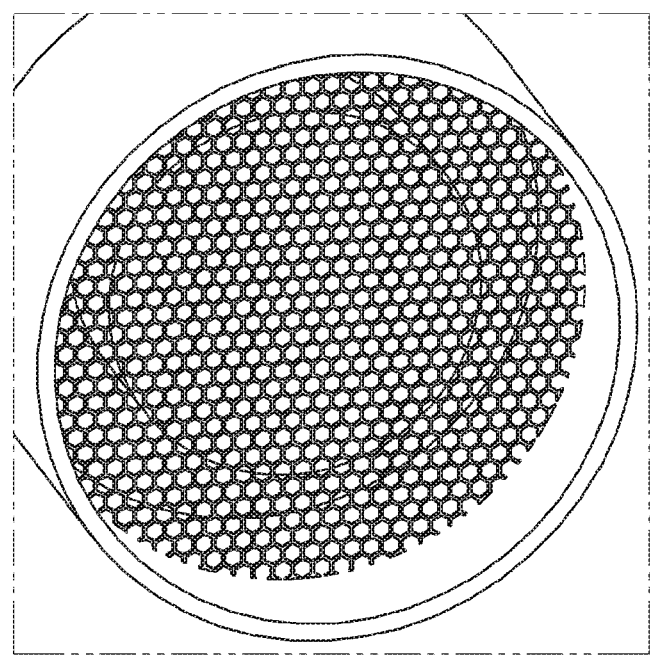
FIG. 18 is a sectional view showing a filter unit according to a third embodiment of the present invention.

FIG. 18 is a sectional view showing a filter unit according to a third embodiment of the present invention.

As shown in FIG. 18, the filter unit 250 has filter holes 251*a*, which are formed in a hexagonal honeycomb shape. In this instance, the honeycomb-shaped filter unit 250 according to the present invention may be formed integrally with the inlet ring 131*a*. Moreover, the honeycomb-shaped filter unit 250 has a predetermined thickness so that the channel of the air inhaled to the blowing fan 132 through the filter holes 251*a* is formed uniformly, thereby enhancing blowing performance.

The embodiments of the orientation control device for a magnetic fluid and the method for same as described above are only the example. Therefore, it will be appreciated by those skilled in the art that various modifications and equivalent other embodiments are possible from the present invention. Therefore, it may be appreciated that the present invention is not limited to the forms mentioned in the above detailed description. Accordingly, the actual technical protection scope of the present invention must be determined by the spirit of the appended claims. Further, it is to be construed that the present invention includes all the changes, equivalents, and substitutions which are defined in the appending claims.

The invention claimed is:

1. An air conditioner for a vehicle comprising:
    an air-conditioning case having a cold air outflow port and a warm air outflow port for discharging air to an interior of the vehicle, a cold air discharge port and a warm air discharge port for discharging air to an outside of the vehicle, and a plurality of blowers;
    an indoor and outdoor air supply means connected with the plurality of blowers to selectively supply indoor air and outdoor air to the plurality of blowers; and
    a control unit for controlling the indoor and outdoor air supply means and the plurality of blowers in a ventilation mode in order to inhale the indoor air of the interior of the vehicle and discharge the indoor air to the outside of the vehicle through the cold air and warm air discharge ports or in order to inhale the outdoor air and introduce the inhaled air to the interior of the vehicle through the cold air and warm air outflow ports;
    wherein the control unit is mounted in the interior of the vehicle, and receives a value from a sensor for measuring temperature or carbon dioxide density and controls the indoor and outdoor air supply means and the plurality of blowers continuously or at regular intervals till the sensor value becomes lower than a set value if the sensor value is higher than the set value, so as to inhale the indoor air of the vehicle to discharge the inhaled air to the outside of the vehicle through the cold air and warm air discharge ports or inhale the outdoor air to introduce the inhaled air to the interior of the vehicle through the cold air and warm air outflow ports.

2. The air conditioner for a vehicle according to claim 1, wherein the plurality of blowers are a first blower mounted at an entrance of the air-conditioning case and a second blower mounted at one side of the first blower, and
    wherein the control unit controls the first blower to inhale the indoor air of the vehicle and discharge the inhaled air to the outside of the vehicle through the cold air and warm air discharge ports and controls the second blower to inhale the outdoor air and discharge the inhaled air to the interior of the vehicle through the cold air and warm air outflow ports in the ventilation mode.

3. The air conditioner for a vehicle according to claim 2, wherein the indoor and outdoor air supply means comprises:
    an intake duct connected with the first and second blowers to communicate with each other and having an indoor air inlet and an outdoor air inlet;
    a first indoor and outdoor air converting door for selectively opening the indoor air inlet and the outdoor air inlet with respect to the first blower; and a second indoor and outdoor air converting door for selectively opening the indoor air inlet and the outdoor air inlet with respect to the second blower.

4. An air conditioner for a vehicle comprising:
    an air-conditioning case having a cold air outflow port and a warm air outflow port for discharging air to an interior of the vehicle, a cold air discharge port and a warm air discharge port for discharging air to an outside of the vehicle, and a plurality of blowers;
    an indoor and outdoor air supply means connected with the plurality of blowers to selectively supply indoor air and outdoor air to the plurality of blowers; and
    a control unit for controlling the indoor and outdoor air supply means and the plurality of blowers in a ventilation mode in order to inhale the indoor air of the interior of the vehicle and discharge the indoor air to the outside of the vehicle through the cold air and warm air discharge ports or in order to inhale outdoor air and introduce the inhaled air to the interior of the vehicle through the cold air and warm air outflow ports;
    wherein the plurality of blowers are a first blower mounted at an entrance of the air-conditioning case and a second blower mounted at one side of the first blower, and
    wherein the control unit controls the first blower to inhale the indoor air of the vehicle and discharge the inhaled air to the outside of the vehicle through the cold air and warm air discharge ports, and controls the second blower to inhale the outdoor air and discharge the inhaled air to the interior of the vehicle through the cold air and warm air outflow ports in the ventilation mode;

wherein the indoor and outdoor air supply means comprises:
   an intake duct connected with the first and second blowers to communicate with each other and having an indoor air inlet and an outdoor air inlet;
   a first indoor and outdoor air converting door for selectively opening the indoor air inlet and the outdoor air inlet with respect to the first blower; and
   a second indoor and outdoor air converting door for selectively opening the indoor air inlet and the outdoor air inlet with respect to the second blower;
   wherein the air-conditioning case includes a cold air passageway, a warm air passageway, the cold air outflow port for introducing the air passing through the cold air passageway to the interior of the vehicle, the cold air discharge port for discharging the air passing through the cold air passage to the outside, the warm air outflow port for introducing the air passing through the warm air passageway to the interior of the vehicle, and the warm air discharge port for discharging the air passing through the warm air passageway to the outside of the vehicle,
   wherein a cold air mode door for opening and closing the cold air outflow port and the cold air discharge port is disposed at one side of the cold air passageway of the air-conditioning case, and
   wherein a warm air mode door for opening and closing the warm air outflow port and the warm air discharge port is disposed at one side of the warm air passageway of the air-conditioning case.

5. The air conditioner for a vehicle according to claim 4, wherein the control unit opens all of the indoor and outdoor air inlets with respect to the first blower, and controls the first indoor and outdoor air converting door so that the indoor air flows to the first blower and controls the second indoor and outdoor air converting door so that the outdoor air flows to the second blower, and
   wherein the control unit controls the cold air mode door so that the indoor air introduced into the first blower is discharged to the outside through the cold air discharge port and controls the warm air mode door so that the outdoor air introduced into the second blower is introduced into the interior of the vehicle through the warm air outflow port.

6. The air conditioner for a vehicle according to claim 4, wherein the control unit controls the first indoor and outdoor air converting door and the second indoor and outdoor air converting door to open the indoor air inlet with respect to the first blower and the second blower, and
   wherein the control unit controls the cold air mode door to discharge the indoor air introduced into the first blower to the outside through the cold air discharge port, and controls the warm air mode door to discharge the indoor air introduced into the second blower to the outside through the cold air discharge port.

7. The air conditioner for a vehicle according to claim 4, wherein the control unit controls the first indoor and outdoor air converting door and the second indoor and outdoor air converting door to open the outdoor air inlet with respect to the first blower and the second blower, and
   wherein the control unit controls the cold air mode door to introduce the outdoor air introduced into the first blower into the interior of the vehicle through the warm air outflow port, and controls the warm air mode door to introduce the outdoor air introduced into the second blower into the interior of the vehicle through the warm air outflow port.

8. An air conditioner for a vehicle comprising:
   an air-conditioning case having an air inlet disposed at one side to introduce air and a plurality of air outflow ports disposed at the other side;
   a blower mounted at the air inlet of the air-conditioning case for introducing indoor air or outdoor air into the air inlet;
   an indoor and outdoor air supply means connected to one side of the blower and having an indoor air inlet and an outdoor air inlet for introducing indoor air or outdoor air into the blower in a direction different from a direction that the air flows into the indoor and outdoor air supply means; and
   a filter unit mounted at an upstream end of the blower to make air uniformly inhaled and moved to the blower;
   wherein the blower, and wherein a second blower is formed to face the first blower, and
   wherein the indoor air inlet and the outdoor air inlet of the indoor and outdoor air supply means are formed to be perpendicular to the first blower and the second blower;
   wherein the filter unit is formed in a convex shape in a reverse direction of an air inhalation channel of the first blower.

9. The air conditioner for a vehicle according to claim 8, wherein the indoor and outdoor air supply means comprises:
   an intake duct connected with the first and second blowers to communicate with each other and having an indoor air inlet and an outdoor air inlet;
   a first indoor and outdoor air converting door for selectively opening the indoor air inlet and the outdoor air inlet with respect to the first blower; and
   a second indoor and outdoor air converting door for selectively opening the indoor air inlet and the outdoor air inlet with respect to the second blower.

10. The air conditioner for a vehicle according to claim 9, wherein a compressor, a condenser, an expansion means and an evaporator are connected as a refrigerant circulation line, and
   wherein the air-conditioning case includes a cold air passageway in which the evaporator is mounted to supply cold air passing through the evaporator to an interior of the vehicle or discharge the cold air to an outside of the vehicle; wherein the air conditioning case further includes a warm air passageway in which the condenser is mounted to supply warm air passing through the condenser to the interior of the vehicle or discharge the warm air to the outside of the vehicle,
   wherein the first blower includes: a first scroll case mounted at an entrance of the air-conditioning case and connected to an inlet of the cold air passageway to send air; a first blowing fan rotatably mounted inside the first scroll case; and a first inlet ring formed at one side of the first scroll case to introduce indoor air and outdoor air,
   wherein the second blower sends air to the warm air passageway and is spaced from the first blower to face the first blower, and includes: a second scroll case connected to an inlet of the warm air passageway; a second blowing fan rotatably mounted inside the second scroll case; and a second inlet ring formed at one side of the second scroll case to introduce indoor air and outdoor air,
   wherein the indoor and outdoor air supply means is mounted and connected to the first and second blowers to supply indoor air and outdoor air in a direction perpendicular to rotary shafts of the first and second blowing fans of the first and second blowers, and wherein the filter unit is mounted at an upstream end of the first inlet ring in an air inhalation direction to make air uniformly inhaled and moved to the first blowing fan.

11. The air conditioner for a vehicle according to claim 10, wherein the first inlet ring is formed at one side of the first scroll case with which the intake duct of the indoor and outdoor air supply means is combined, and wherein the second inlet ring is formed at one side of the second scroll case with which the intake duct of the indoor and outdoor air supply means is combined to face the first inlet ring.

12. The air conditioner for a vehicle according to claim 10, wherein the filter unit is detachably mounted at a fitting part formed at the upstream end of the first inlet ring.

13. The air conditioner for a vehicle according to claim 10, wherein the filter unit is a mesh filter made of a metallic material.

14. An air conditioner for a vehicle comprising:

an air-conditioning case having an air inlet disposed at one side to introduce air and a plurality of air outflow ports disposed at the other side;

a blower mounted at the air inlet of the air-conditioning case and having a blowing fan for introducing indoor air or outdoor air into the air inlet;

an indoor and outdoor air supply means connected to one side of the blower and having an indoor air inlet and an outdoor air inlet for introducing indoor air or outdoor air into the blower in a direction different from a direction that the air flows into the indoor and outdoor air supply means; and a filter unit mounted at an upstream end of the blower to make air uniformly inhaled and moved to the blowing fan;

wherein the blower includes a first blower, and wherein a second blower is formed to face the first blower, and wherein the indoor air inlet and the outdoor air inlet of the indoor and outdoor air supply means are formed to be perpendicular to the first blower and the second blower;

wherein the filter unit has a plurality of filter holes, and the plurality of filter holes are expanded to get wider toward the blowing fan.

15. The air conditioner for a vehicle according to claim 14, wherein the plurality of filter holes are each formed in a hexagonal honeycomb shape.

* * * * *